United States Patent
Revital et al.

(10) Patent No.: US 11,019,407 B2
(45) Date of Patent: May 25, 2021

(54) SYSTEMS AND METHODS FOR PROVIDING WATERMARKED CONTENT

(71) Applicant: Synamedia Limited, Staines Upon Thames (GB)

(72) Inventors: Dan Revital, Jerusalem (IL); Doron Nissimi, Jerusalem (IL); Steve Epstein, Hashmonaim (IL)

(73) Assignee: SYNAMEDIA LIMITED, Staines Upon Thames (GB)

( * ) Notice: Subject to any disclaimer, the term of this patent is extended or adjusted under 35 U.S.C. 154(b) by 0 days.

(21) Appl. No.: 16/552,038

(22) Filed: Aug. 27, 2019

(65) Prior Publication Data

US 2021/0067842 A1    Mar. 4, 2021

(51) Int. Cl.
| | | |
|---|---|---|
| H04N 21/8358 | (2011.01) | |
| H04N 21/2347 | (2011.01) | |
| H04N 21/239 | (2011.01) | |
| H04N 21/24 | (2011.01) | |
| H04N 1/32 | (2006.01) | |
| G06T 1/00 | (2006.01) | |

(52) U.S. Cl.
CPC ....... *H04N 21/8358* (2013.01); *G06T 1/0021* (2013.01); *H04N 1/32149* (2013.01); *H04N 21/2347* (2013.01); *H04N 21/2393* (2013.01); *H04N 21/2407* (2013.01)

(58) Field of Classification Search
CPC .......... H04N 21/8358; H04N 1/32149; H04N 21/2393; H04N 21/2407; H04N 21/2347; H04N 1/32144; H04N 21/23892; H04N 2201/3233; H04N 2005/91335; G06T 1/0021
USPC .......................................................... 725/19
See application file for complete search history.

(56) References Cited

U.S. PATENT DOCUMENTS

| | | | |
|---|---|---|---|
| 10,475,145 B1 * | 11/2019 | Lester .................. | G06K 9/4671 |
| 2003/0095683 A1 * | 5/2003 | Najarian ............... | G06T 1/0071 |
| | | | 382/100 |
| 2004/0151313 A1 * | 8/2004 | Weirauch ........... | H04N 1/32352 |
| | | | 380/203 |

(Continued)

FOREIGN PATENT DOCUMENTS

CN    108510426 A  *  9/2018

OTHER PUBLICATIONS

T. Sasaki and T. Nagase, "Constructing Digital Watermark Based on Orthogonal Functions," 2018 5th IEEE International Conference on Cyber Security and Cloud Computing (CSCloud)/2018 4th IEEE International Conference on Edge Computing and Scalable Cloud (EdgeCom), Shanghai, 2018, pp. 140-143, doi: (Year: 2018).*

(Continued)

*Primary Examiner* — Cynthia M Fogg
(74) *Attorney, Agent, or Firm* — Finnegan, Henderson, Farabow, Garret & Dunner, LLP

(57) ABSTRACT

A content processing system obtains an identification associated with a device configured to receive content, generates a digital watermark reflecting the receiving device's identification, provides watermarked content by including the digital watermark in the content, and transmits the watermarked content from an edge computing device to the receiving device for the playback. The digital watermark is not visually observable during playback of the watermarked content, and it enables tracking of transmission of the watermarked content.

20 Claims, 18 Drawing Sheets

(56) References Cited

U.S. PATENT DOCUMENTS

| | | | |
|---|---|---|---|
| 2004/0223612 A1* | 11/2004 | Kamijoh | H04N 19/42 380/201 |
| 2019/0164250 A1* | 5/2019 | Li | H04N 21/466 |
| 2020/0014988 A1* | 1/2020 | Navali | H04N 21/234309 |
| 2020/0126176 A1* | 4/2020 | Lees | G06F 21/16 |

OTHER PUBLICATIONS

W. Zheng et al., "Robust and high capacity watermarking for image based on DWT-SVD and CNN," 2018 13th IEEE Conference on Industrial Electronics and Applications (ICIEA), Wuhan, 2018, pp. 1233-1237, doi: 10.1109/ICIEA.2018.8397898. (Year: 2018).*

* cited by examiner

700

SYSTEMS AND METHODS FOR PROVIDING WATERMARKED CONTENT

TECHNICAL FIELD

The present disclosure relates to systems and methods for distributing content, and more particularly, to systems and methods for watermarking the content and distributing the watermarked content to client devices.

BACKGROUND

Digital watermarking enables distributors of multimedia content to embed a unique digital identification into the multimedia content, where the content may include digital images, video data, and audio data. A digital watermark may be imperceptible to humans but can be detected by computers, routers, and various digital devices. For instance, a unique digital watermark can be easily embedded into a copy of a confidential document or a copy of a video streaming signal, as the copy is being created and/or distributed.

The data contained in the digital watermark may include identifiable information about a recipient, such that a copy of the multimedia content that is intentionally leaked and distributed may be traced back to the recipient. Additionally, distributors of multimedia content can use network detectors to check for digital watermarks within documents, images, video and audio data, and disrupt attempts to upload the watermarked content to the web or forwarding it in an email.

Digital watermarking faces important challenges. For example, a digital watermark embedded in multimedia content is preferably be tolerant to image processing techniques, such as compression (lossless and lossy) as well as to intentional attempts to destroy or remove the digital watermark. Other challenges include the requirement of watermark imperceptibility and the ability for the digital watermark to incorporate a sufficient amount of data that can be used to identify one or more devices for receiving the multimedia content. Another challenge is associated with designing a multimedia distributing system that can distribute a large amount of multimedia content in real time while providing digital watermarks for multimedia content.

The disclosed systems and methods for providing watermarked multimedia content to client devices address one or more of the problems set forth above and/or other problems in the prior art.

SUMMARY

Consistent with a disclosed embodiment, a processing system may include at least one processor executing instructions for performing operations. The operations may include obtaining an identification associated with a user device configured to receive content, using an InfoGAN machine learning approach, generating a digital watermark reflecting the device identification, providing watermarked content by embedding the digital watermark in the content, wherein the digital watermark is not visually observable during playback of the watermarked content, and enables tracking of transmission of the watermarked content, and transmitting the watermarked content to the device for the playback.

Consistent with another disclosed embodiment, a system comprises one or more edge computing systems communicatively coupled to one or more user devices. The edge computing system may perform operations that may include receiving content, using a machine learning approach, watermarking the content with a digital watermark reflecting an identification associated with a particular one of the user devices, wherein the digital watermark is not visually observable during playback of the content and enables tracking of transmission of the content, and transmitting the watermarked content to the particular one of the user devices for the playback.

Consistent with another disclosed embodiment, an edge computing system is communicatively coupled with a server via a first secure connection, and communicatively coupled with a user device via a second connection. The edge computing system may perform operations that may include receiving a request for content from the user device, the request including user device identification information, transmitting identifiable information for the content to the server, receiving the content from the server, using a machine learning approach, watermarking the content with a digital watermark reflecting an identification associated with a particular one of the user devices, wherein the digital watermark is not visually observable during playback of the content and enables tracking of transmission of the content, and transmitting the watermarked content to the particular one of the user devices for the playback.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings.

DETAILED DESCRIPTION

Figure 1:
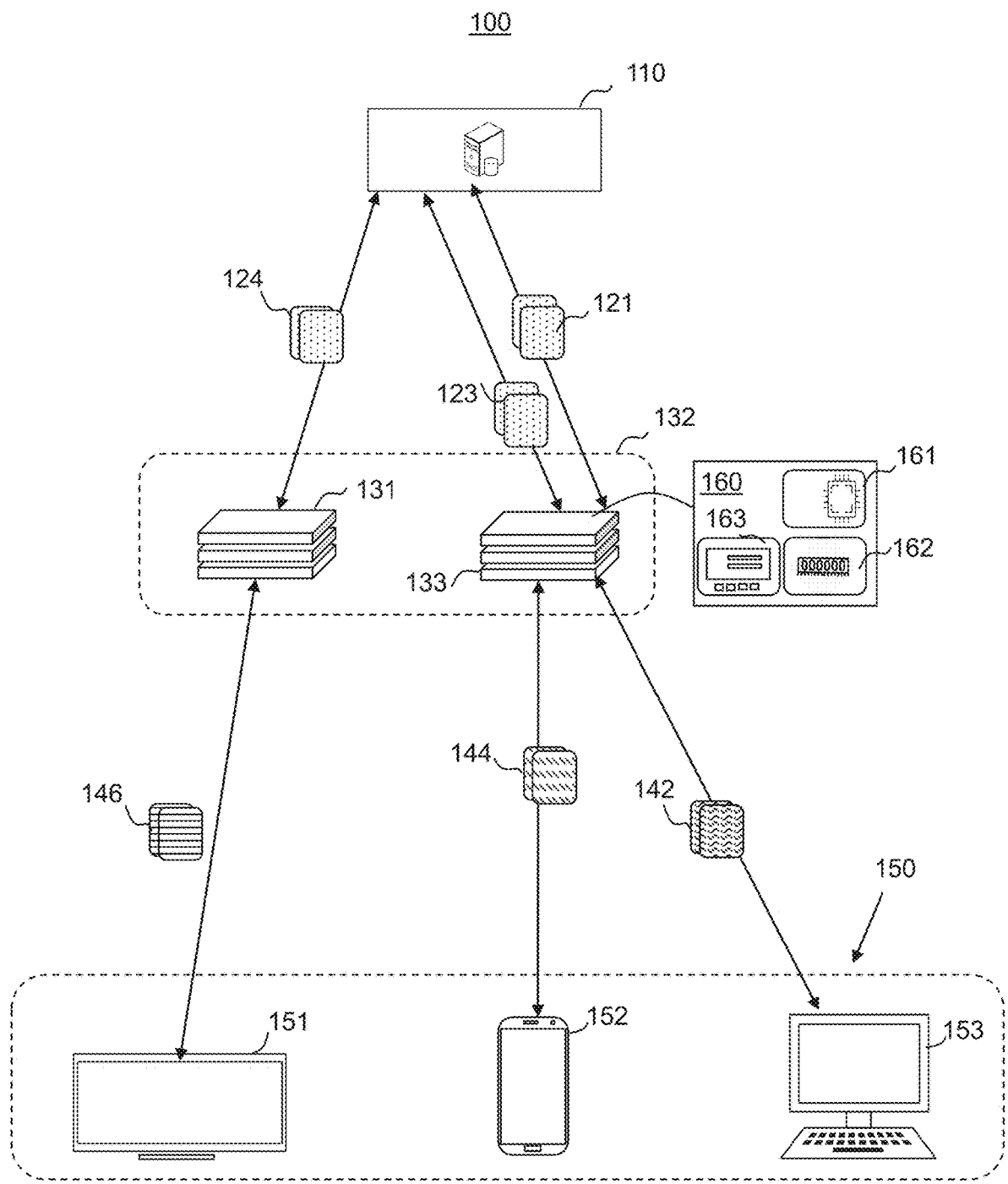
FIG. 1 is an illustrative system for streaming and watermarking content consistent with disclosed embodiments.

Reference will now be made in detail to exemplary embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments relate to systems and methods for watermarking content such as multimedia content. Disclosed embodiments allow for a watermark generation in multimedia content and for detection of the watermarked content. The multimedia content can include a video signal, an audio signal, an image, speech signals, 3D graphical objects, texts, software codes, network streams, XML data, or any other suitable binary or text data. The watermarking may use computer-based models such as machine-learning techniques, such as neural networks.

One of the outstanding problems for digital watermarking relates to the development of efficient systems and methods for implementing a digital watermark for content, such as video signals, that is not delayed or distorted during a streaming of the content to a variety of user devices such as smartphones, tablets, connected televisions and set top boxes. In various embodiments, the digital watermarking methods (e.g., the methods based on neural networks) may be too computationally intensive to be implemented at a user device level (e.g., as a part of a software application installed on a user device). Furthermore, implementing digital watermarking at the device level may cause security issues (e.g., attempts by a user to modify the software to disable a process of digital watermarking, and the like). On the other hand, implementing digital watermarking methods on a server (e.g., on one or more cloud servers) may be impractical due to scalability associated with a large number of devices (e.g., millions of devices) that may request the same content (with a unique watermark) concurrently, from the server. Hence, one of the approaches proposed in this disclosure, is to use a multi-access edge computing system (MEC) of a 5G network to digitally watermark the content. In some embodiments, the edge computing system may need to support a limited number of devices (e.g., one device, ten devices, hundred devices, few thousand devices, or few tens of thousands of devices) that may request the content at about the same time. The edge computing system may have a sufficient amount of a processing power to watermark the content for all of the content receiving user devices. In addition, the edge computing system provides for a secure way of digitally watermarking the content, as it prevents access to data or various software applications of the edge computing system by outside parties (e.g., users of the user devices).

In an example embodiment, the system for watermarking content may be a content processing system that may be a computer system that includes a processor and a memory for storing instructions. The content processing system may obtain identifiable information associated with a user device (also referred to as a device identification) configured to receive content and generate a digital watermark reflecting the identification of the device. In an example embodiment, the identifiable information associated with the user device may include a machine code, an IP address, a type of device (e.g., a laptop, a smartphone, a router, etc.), a location of the device (e.g., GPS coordinates, address of the location, and the like). In some embodiments, the content processing system may obtain identifiable information associated with an account of the user that is used for the authentication of the user device. The identifiable information associated with the user account may be a user id, a user email, a user name, an image of the user, a user address, a user financial information (e.g., a user credit card number, a bank account number, and the like) or any other suitable identifiable information related to the user.

The content processing system may be configured to generate a digital watermark that contains the identification associated with the user device or the identifiable information associated with the account of the user. The watermarked content reflects the receiver (e.g., a user receiving the multimedia content, a device for receiving the content, or a user account for receiving the content) of the content, and the receiver of the content can be identified based on the detected watermark within the content.

The content processing system may generate a digital watermark using a machine machine-learning model, such as, for example, neural networks. In some embodiments, the content processing system may include multiple machine-learning models (e.g., multiple neural network systems) capable of interacting with one another. For example, machine-learning models may include neural networks, recurrent neural networks, convolutional neural networks, generative adversarial networks, decision trees, and models based on ensemble methods, such as random forests, generative adversarial network (GAN), or an information theoretic extension to the GAN (InfoGAN). For example, the content processing system may generate the digital watermark using InforGAN machine-learning model.

It should be noted that the content processing system may include any other suitable information that may be contained in the watermark and retrieved from the watermarked content using the specialized application. For example, the information contained in the watermark may include transmission related information (e.g., time of transmission, network information, encoding type for the content, information related to the content processing system, devices used to facilitate transmission such as routers, edge computing systems, processors, memory devices, servers, and the like). Additionally, the information contained in the watermark may be related to the content. For example, the information may include the content classification (e.g., video, image, audio, software, code, script, article, etc.) the keywords associated with the content (e.g., a title of a video if the content is the video), the size of the media, or any other suitable characteristics of the media (e.g., the duration of the media for the media being an audio or video), a public key associated with the content processing system that can be used to encrypt messages received by the content processing system, and the like.

The content processing system may include more than one watermark in content. For example, the system may include in the content a first watermark containing identifiable information associated with a user device and a second watermark containing content related information. In some embodiments, when watermarking multimedia content containing multiple media (e.g., a video containing video frames and an audio signal), the first watermark may be embedded into one or more video frames and a second watermark may be embedded into an audio signal. It should be understood that any number of watermarks containing any suitable information may be used to watermark the multimedia content. After including the digital watermark, the content processing system is configured to transmit the watermarked content to the user device for the playback. For example, the content processing system may include software that when executed by a processor, performs internet-related communication (e.g., TCP/IP) and transmits the watermarked content to the user device.

In various embodiments, the digital watermark may be embedded in the multimedia content and may not be visually observable during playback/display of the watermarked multimedia content. For example, the digital watermark may be a random data superimposed over an image data contained in the multimedia content. In an example embodiment, a digital watermark may be an audio signal not observable during playback of multimedia content containing audio. The embedded digital watermark may enable tracking of transmission of the watermarked content to a user device, as it contains identifiable information associated with the user device.

Depending on an application of the digital watermarking, the watermarking system is designed to address the tradeoff problem resulting from competition among watermark capacity, robustness, watermark imperceptibility, and computational costs associated with the digital watermarking.

Watermark capacity relates to the amount of information that can be contained (also referred to as encoded) within the watermark. The watermark capacity is directly related to a bit size of the watermark as well as a bit size of the content. In an example embodiment, the content processing system may be configured to receive the information that needs to be contained in the watermark and select a bit size for the watermark sufficient to encode the received information.

The term "robustness" generally refers to how well the watermark can be extracted after the content undergoes operations such as conversion, compression, resizing, cropping, and editing (e.g., resizing, cropping, color adjustments, and the like). In various embodiments, while the watermark needs to be extractable after the content undergoes the common operations, the extracted watermark may not be similar to the original one. The difference between the original watermark and the extracted watermark may be measured using any suitable measuring function. For example, the measuring function may be computed by determining difference values between bits of binary data of the extracted and the original watermark and computing an average value of the difference values squared. Other measure functions may be computer-based models that may include a set of operations for transforming the extracted and/or the original watermark using any suitable transformations (e.g., scaling, adjusting colors, and the like) prior to evaluating the difference between the original and the extracted watermark.

In some cases, the term "robustness" refers to how well the information encoded in a watermark can be extracted/identified after tampering operations (also referred to as attacks) with the content. The tampering attacks may be classified as an active attack (e.g., an attempt to remove a watermark from the watermarked content), a passive attack (e.g., an attempt to establish that the content contains a watermark), an active attack (e.g., an attempt to modify the content containing a watermark to affect the information embedded within the watermark), or a forgery attack (e.g., an attempt to watermark the content with a plausible watermark). In various embodiments, the active attack may include a collusion attack which includes manipulating several versions of watermarked content corresponding to the same video broadcast, to obtain unprotected content (i.e., content whose watermark, if present, does not contain information that allows identifying one or more users and/or devices for receiving the content).

The term "watermark imperceptibility" or "watermark transparency" refers to the amount of distortion of the content containing the watermark. Imperceptibility can be expressed by measuring the fidelity of the content. One of the tests for establishing the fidelity may be the subjective test that involves human observation. One of the subjective tests may be a mean opinion score (MOS) that is based on reporting the dissimilarities between the quality of the original and watermarked objects.

Additionally, or alternatively, an objective test may be performed to establish fidelity. The objective test may compute the amount of the watermark distortion by comparing a difference between the original content and the watermarked content. A simple and common method known as the signal-to-noise ratio (SNR) can be a good example of objective measurement which quantifies the watermarked distortion by expressing it as a noise. The objective tests may vary for different digital content. In the case of audio and speech watermarking, the main tests may include spectral distortion (SD), root-mean-squared error (RMSE), mean squared error (MSE), peak signal-to-noise ratio (PSNR), and segmental signal-to-noise ratio (SEGSNR). It should be noted that any other suitable test may be performed for image/video quality assessment metric (IQA) that may include determining structural similarity metric (SSIM) or a video multimethod assessment fusion (VMAF) metric for the watermarked image or the watermarked video signal.

The content processing system needs to ensure a low false positive rate and a low false negative rate. The term "false positive" refers to the detection of a watermark when there is no actual watermark in the watermarked object, and the term "false negative" refers to the inability of detecting a watermark when the watermark is present in the content.

The content processing system may be a computing system that is a part of a network system for distributing content. An example network system 100 is shown in FIG. 1. Network system 100 may include a server 110, a set of edge computing systems 132 communicatively connected to server 110 and user devices 150. For example, FIG. 1 shows an edge computing system 131 connected to a device 151 and an edge computing system 133 connected to a device 152 and a device 153. In some instances, the content processing system may be part of an edge computing system. In an example embodiment, FIG. 1 shows a content processing system 160 as a part of edge computing system 133. System 160 may include one or more processors 161, a memory 162 for storing programming instructions, and an interface 163 for modifying programming instructions and controlling various parameters of system 160.

In various embodiments, server 110 may include at least one database for storing content, including for example, the multimedia data, and any other relevant data related to the performance of server 110. For example, other relevant data may include profile data of various users of server 110 that can include user multimedia preferences, user authentication information, or any other user related information (e.g., links to other users, and the like). Server 110 may include at least one processor for performing various tasks, such as receiving communication data from edge computing systems 132, decrypting the communication data, for cases when the data is encrypted, analyzing the communication data (e.g., determining what type of multimedia is being requested by a user device, authenticating the user device, and the like), retrieving multimedia content requested by the user device, encrypting the content, and transmitting the encrypted content to one or more edge computing systems. FIG. 1 shows, for example, that encrypted communication data 121 is communicated to server 110 that may include a request for multimedia content by device 153. Server 110 may retrieve multimedia content 123, encrypt content 123 and communicate content 123 to edge computing system 133. Edge computing system 133 may decrypt at least a portion of the encrypted content 123, and using content processing system 160, generate a digital watermark and include the digital watermark into the decrypted portion of the content. In an example embodiment, system 160 may communicate with device 153 using data packages 142 to obtain identifiable information (e.g., device identification, account related information or user related information as described above) and include the identifiable information into the digital watermark. FIG. 1 shows content 123, 124 that are used for data exchange between server 110 and edge computing systems 131 and 133 and data packages 146, 144, and 142 used for exchanging data between edge computing systems 132 and user devices 150.

As described above, content processing system 160 may include trainable computer-based machine-learning models. For example, the number of features and number of layers in a GAN or an InfoGAN may be optimized to improve the model's performance. The GAN and InfoGAN model include a generator neural network and adversarial neural network (also referred to as a discriminator) competing against each other. In various embodiments, generator and discriminator may be any suitable machine-learning methods such as convolutional neural networks, recurrent neural networks, and the like.

In an example embodiment, a discriminator may be tasked in classifying whether content is modified. For example, the discriminator may be trained to determine if video content is consistent with the video content of a given program or a set of programs. In an example embodiment, when training a discriminator, the discriminator may be given video content and a label characterizing the video content. For instance, the discriminator may be given video content corresponding to a news channel and a label "TRUE," as well as video content corresponding to various other channels and a label "FALSE." The discriminator may then be trained to identify the news channel and differentiate it from other channels. Similarly, the discriminator may be trained to identify distortions or alterations to the video content that may be observable to a user during playback. For example, the discriminator may identify regions in the video signal that seem to be out of places, such as obtrusive observable marks in the video, unusual changes in the background, and the like. In an example embodiment, a discriminator may be trained to identify alterations to video content where the content may correspond to a particular program. For example, a discriminator may be trained to detect changes in a background for a given news channel, as the background of the news channel may be substantially unchanged between different instances of the video content. Similarly, the discriminator may be trained to identify any other changes in a video signal, such as changes in coloring, changes in position, the presence of observable digital watermarks, and the like.

Figure 2A:
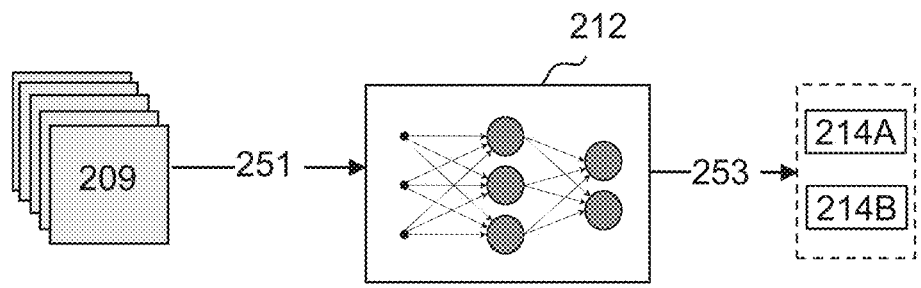
FIG. 2A is an illustrative discriminator for testing fidelity of content consistent with disclosed embodiments.

FIG. 2A shows a flow diagram 201 of an example discriminator 212 that may be a machine-learning model such as a neural network. At step 251, discriminator 212 takes as an input content 209 (e.g., a video signal having multiple video frames) and at step 253 returns one of the classification labels 214A or 214B. For example, the video signal may be a streaming video of a news channel, label 214A may be "TRUE" indicating that the video signal is not altered, and label 214B may be "FALSE" indicating the video signal is altered.

Discriminator 212 may be trained using watermarks of different intensity. The term "watermark intensity" (also referred to as watermark embedding strength) refers to a parameter that determines the visibility of the watermark when it is embedded in an image. For example, a watermarked image may be represented by $I_w=I_0+S \cdot W$, where $I_w$ is a digital representation of an image containing a watermark, $I_0$ is a digital representation of an original image, W is a digital representation of the watermark and S is a watermark intensity that can vary from zero to one. In various embodiments, $I_w$, $I_0$, and W may be arrays of numbers, where at least some of the numbers may correspond to a color of a pixel in the image. In an example embodiment, W may be a white (Gaussian) noise, or be any suitable digital pattern. In some embodiments, watermark intensity S may be a single number, and in some cases, the watermark intensity may be an array of numbers having the same size as the array of numbers for $I_w$, $I_0$, or W. For cases when S is an array of numbers, S·W correspond to a scalar product of S and W (i.e., $S \cdot W = \Sigma s_i w_i$) where $s_i$ and $w_i$ are elements of S and W arrays.

Figure 2B:
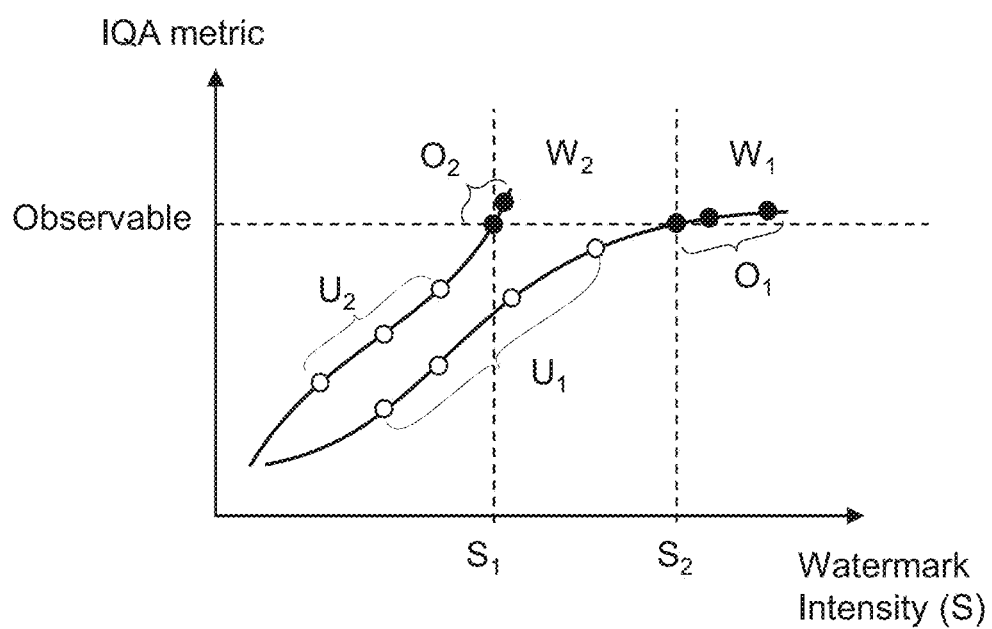
FIG. 2B is an illustrative graph for determining image quality metric as a function of watermark intensity consistent with disclosed embodiments.

In some embodiments, a watermark may be generated by a generator and included in an image using a first intensity S. The watermarked image may be subject to a subjective test, as described above, to establish image fidelity. If the watermark is not recognized, the watermarked image may be labeled as "UNOBSERVABLE" or any other suitable label to indicate that the watermark in the image is not observable for the human observer. If the watermark is recognized, the watermarked image may be labeled as "OBSERVABLE" or any other suitable label. Additionally, or alternatively, the watermarked image may be subject to any suitable objective test, as described above, to establish image fidelity. In various embodiments, the watermarked image may be generated with increasing levels of watermark intensity until the watermark is "OBSERVABLE" (e.g., either via the subjective or the objective tests). FIG. 2B shows two graphs showing a dependence of IQA metric on watermark intensity S for two different digital watermarks $W_1$ and $W_2$. For example, points $U_1$ and $U_2$, corresponding respectively to the digital watermarks $W_1$ and $W_2$, are "UNOBSERVABLE" and points $O_1$ and $O_2$, corresponding respectively to the digital watermarks $W_1$ and $W_2$, are "OBSERVABLE." The watermark intensities $S_1$ and $S_2$ correspond to intensity values at which respective watermarks $W_1$ and $W_2$ become "OBSERVABLE." In various embodiments, points $O_1$, $O_2$, $U_1$, and $U_2$ or any other points on graphs corresponding to watermarks $W_1$ and $W_2$ may be used to train discriminator 212 to differentiate among content containing an observable watermark and the content that does not contain an observable watermark.

Figure 2C:
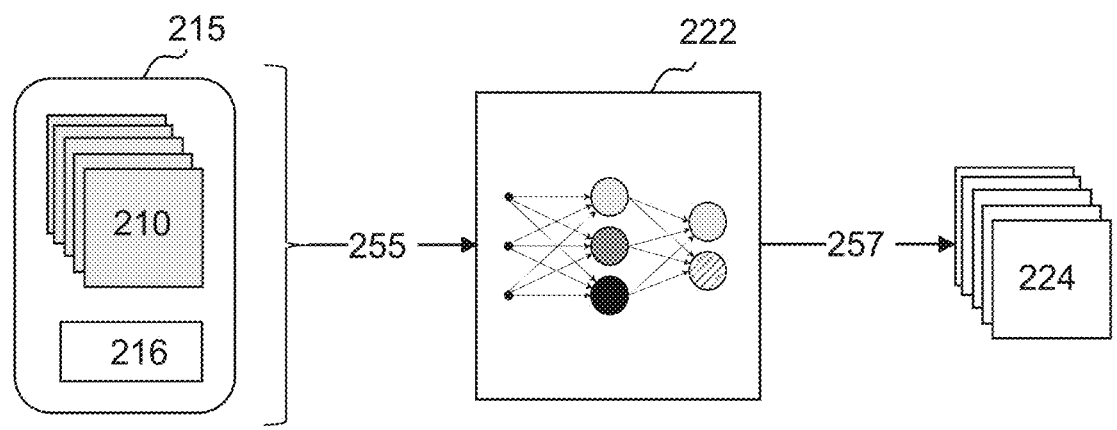
FIG. 2C is an illustrative generator for generating watermarked content consistent with disclosed embodiments.

FIG. 2C shows a diagram 202 of an example generator 222 that may be a machine-learning model such as a neural network. At step 255, generator 222 takes as an input 215 that includes content 210 (e.g., a video signal having multiple video frames) and a metadata 216. Metadata 216 may include information that is encoded into a digital watermark. For example, as described above, the information may be a device identifiable information, a user account identifiable information or a user identifiable information. In some embodiments, metadata may include, as described above, transmission related information, multimedia related information, and the like. At step 257, generator 222 may generate watermarked content 224.

Generator 222 may generate and embed a digital watermark in content such as images or video data using a variety of ways. For example, generator 222 may generate a digital watermark as random noise. Additionally, or alternatively, generator 222 may use singular value decomposition (SVD) to decompose content, represented by an array of numbers, to obtain eigenvalues and eigenvectors for the content. Subsequently, the digital watermark may be added by altering the obtained eigenvectors. Additionally, or alternatively, the content may be transformed using any suitable transformation techniques such as fast Fourier transform, wavelet transform and the like, with the digital watermark applied to the transformed data.

Figure 3:
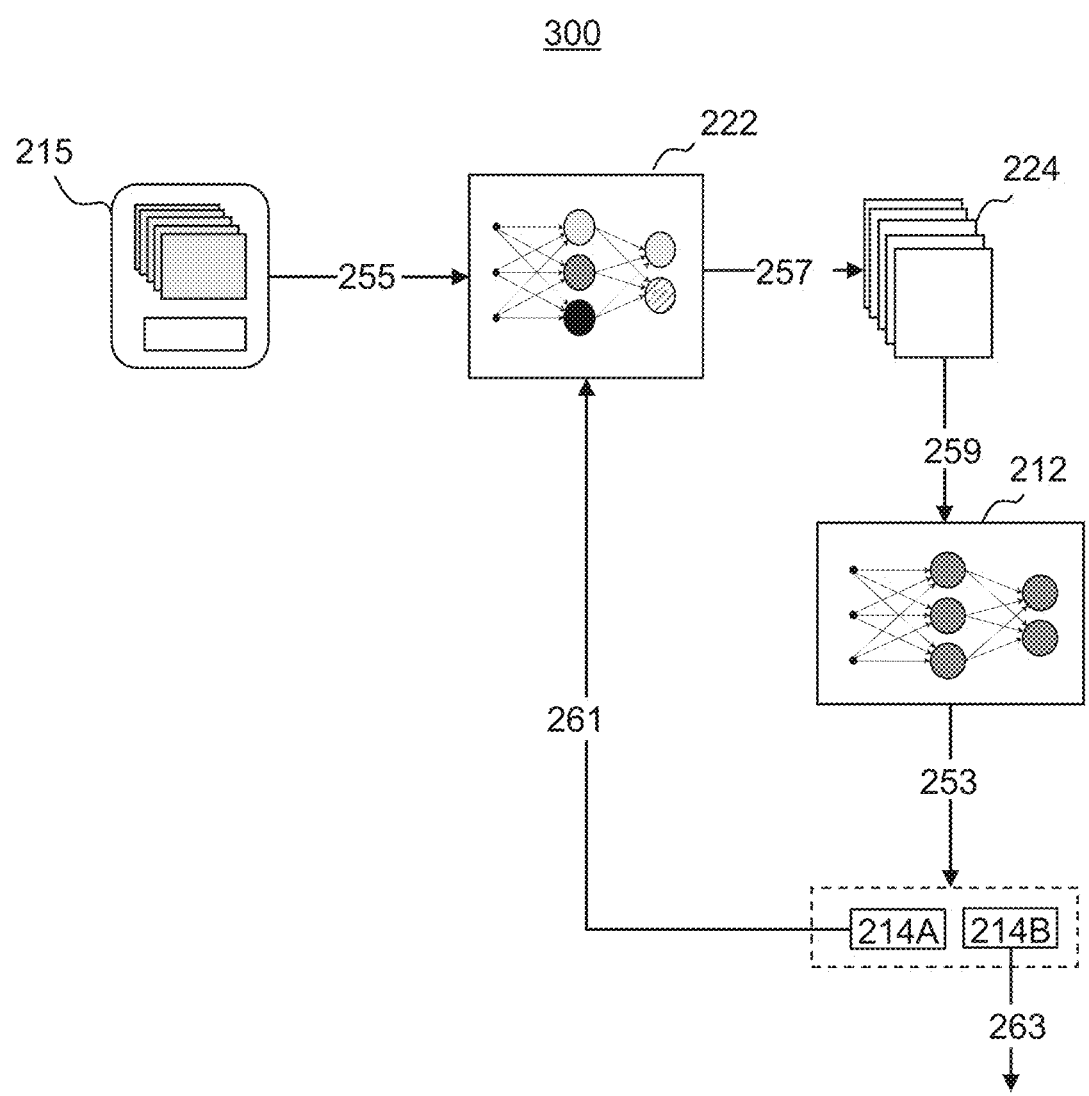
FIG. 3 is an illustrative feedback system for training a generator for generating watermarked content consistent with disclosed embodiments.

In some embodiments, generator 222 may be a machine-learning model such as a neural network. Generator 222 may be trained using a flow diagram 300 shown in FIG. 3. In an example embodiment, at step 255, generator 222 may receive input 215 and output watermarked content 224 at step 257. At step 259, content 224 may then be input to a discriminator 212, and discriminator 212 may output classification labels 214A or 214B at step 253. In an example embodiment, classification label 214A may indicate that content 224 contains the watermark (e.g., discriminator 212 recognized that content 224 had been altered) and classification label 214B may indicate that content 224 does not contain the watermark (e.g., discriminator 212 did not recognize that content 224 has been altered). If discriminator 212 outputs classification label 214B, then generator 222 succeeded in watermarking the content, and flow diagram 300 may proceed to step 263 at which the training process may be repeated for a different input 215. If discriminator 212 outputs classification label 214A, then generator 222 did not succeed in watermarking the content, and at step 261 parameters of generator 222 may be modified. For example, if generator 222 is a neural network model, the weights of the neural network are modified via backward propagation approach, thus modifying generator 222. Additionally, or alternatively, a structure of the neural network may be modified (e.g., by adding more nodes to the neural network). After completion of step 261, the modified generator 222 may attempt to watermark content 224 by receiving input 215 at step 255 and outputting watermarked content 224 at step 257. The training process, including steps 255 through 261, may be repeated until it is established that generator 222 succeeded in watermarking the content (e.g., by discriminator 212 outputting classification label 214B).

Figure 4:
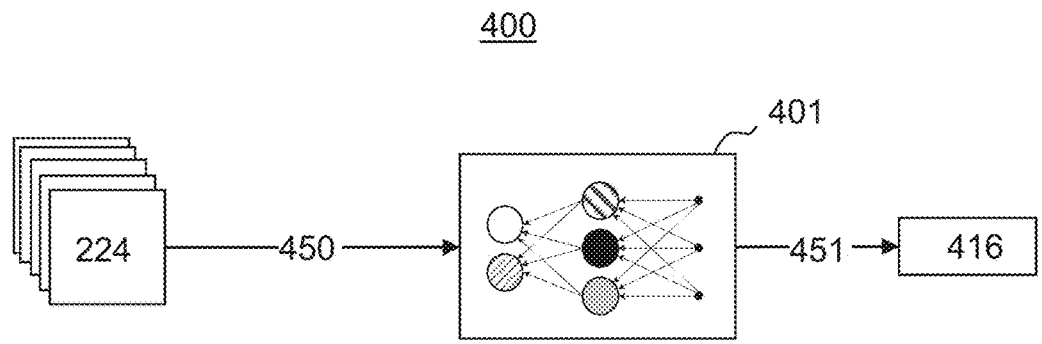
FIG. 4 is an illustrative diagram describing the use of an identifier consistent with disclosed embodiments.

Generally, the generated digital watermark should be visually indistinguishable when embedded or included into the original content and should be unique for information (e.g., metadata 216) encoded in the digital watermark. For example, the watermarked content should change with the change of metadata 216. In various embodiments, an identifier may be used to retrieve metadata 216 from the watermarked content generated by generator 222. An example identifier 401 is shown in FIG. 4 as a part of a flow diagram 400. Identifier 401 may be a machine-learning model depending on a type of generator 222 used to generate watermarked content 224, as shown in FIG. 4. For example, identifier 401 may be a convolutional neural network, a recurrent neural network, and the like. Flow diagram 400 illustrates a process of identifying metadata 216 within watermarked content 224. At step 450, identifier 401 takes as an input content 224 (e.g., a watermarked video signal having multiple video frames) and at step 451 outputs metadata 416. In various embodiments, generator 222 and identifier 401 may use a blind or nonblind approach for generating and identifying the watermarked content. The watermarking technique is said to be blind if it does not require access to the original unwatermarked data (image, video, audio, etc.) to recover the watermark. Conversely, a watermarking technique is said to be nonblind if the original content is needed for the extraction of the watermark.

Figure 5:
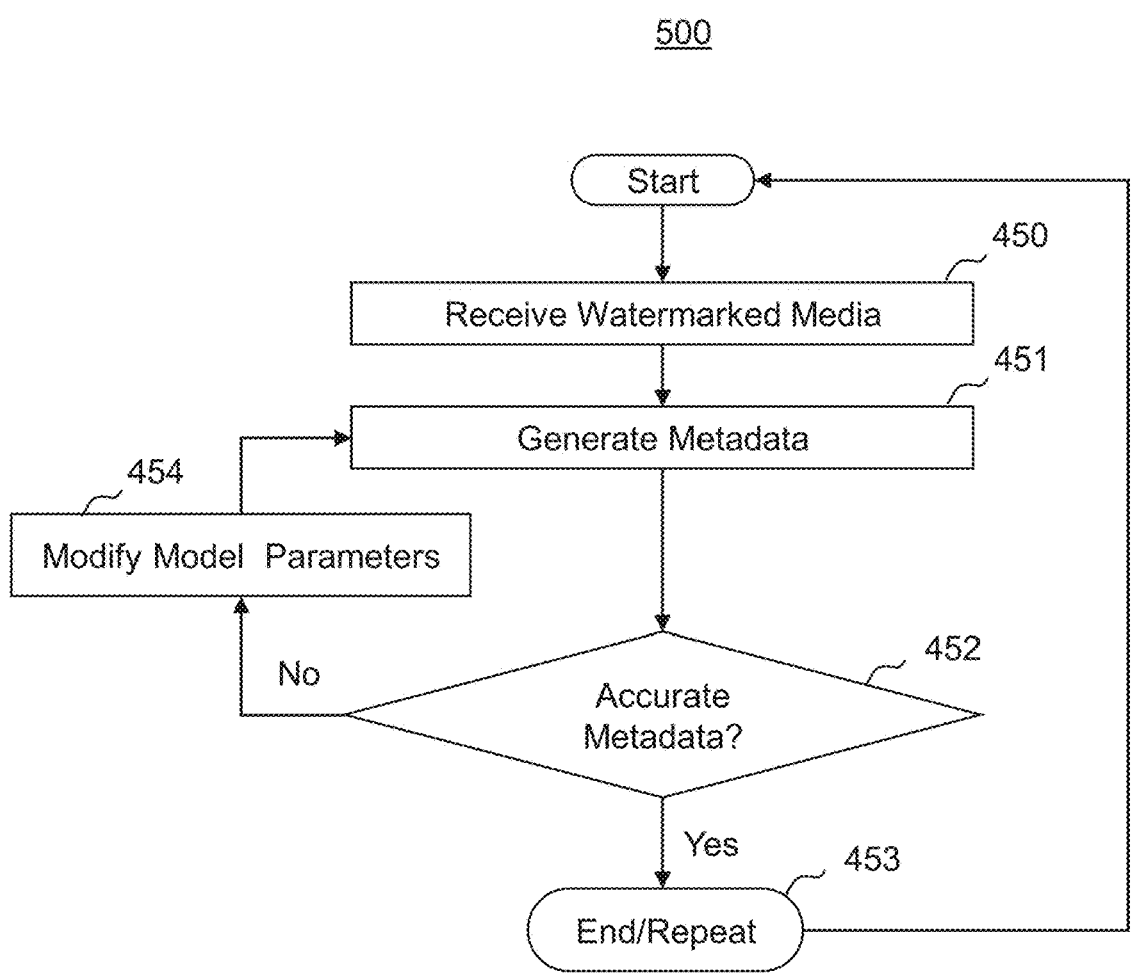
FIG. 5 is an illustrative process of modifying parameters of an identifier consistent with disclosed embodiments.

In an example embodiment, shown in FIG. 5, identifier 401 may be trained using a process 500. At step 450, identifier 401 may receive watermarked content (e.g., content 224), and at step 451, it may generate metadata 416. At step 452, a generated metadata 416 may be compared with original metadata 216 to evaluate the error (also referred to as a cost function) in data 416 (i.e., if data 416 is an accurate representation of data 216). When the cost function is below a predetermined objective value (step 452, Yes), process 500 may proceed to step 453 at which the training process may be repeated for a different received content 224. Alternatively, at step 453, the training process may be stopped if identifier 401 is sufficiently trained (e.g., identifier 401 consistently generates accurate metadata 416). In an example embodiment, identifier 401 is trained if it generates accurate metadata 416 with a target success rate (e.g., 95% success rate, 98% success rate 99% success rate, 99.9% success rate, and the like). When the cost function is above the predetermined objective value (step 452, No), process 500 may proceed to step 454 at which parameters of identifier 401 may be modified via a backward propagation approach. For example, if identifier 401 is a neural network, the weights or biases of the neural network may be modified. Additionally, or alternatively, a structure of the neural network may be modified (e.g., by adding more nodes to the neural network). After completion of step 454, process 500 may proceed to step 451.

Figure 6A:
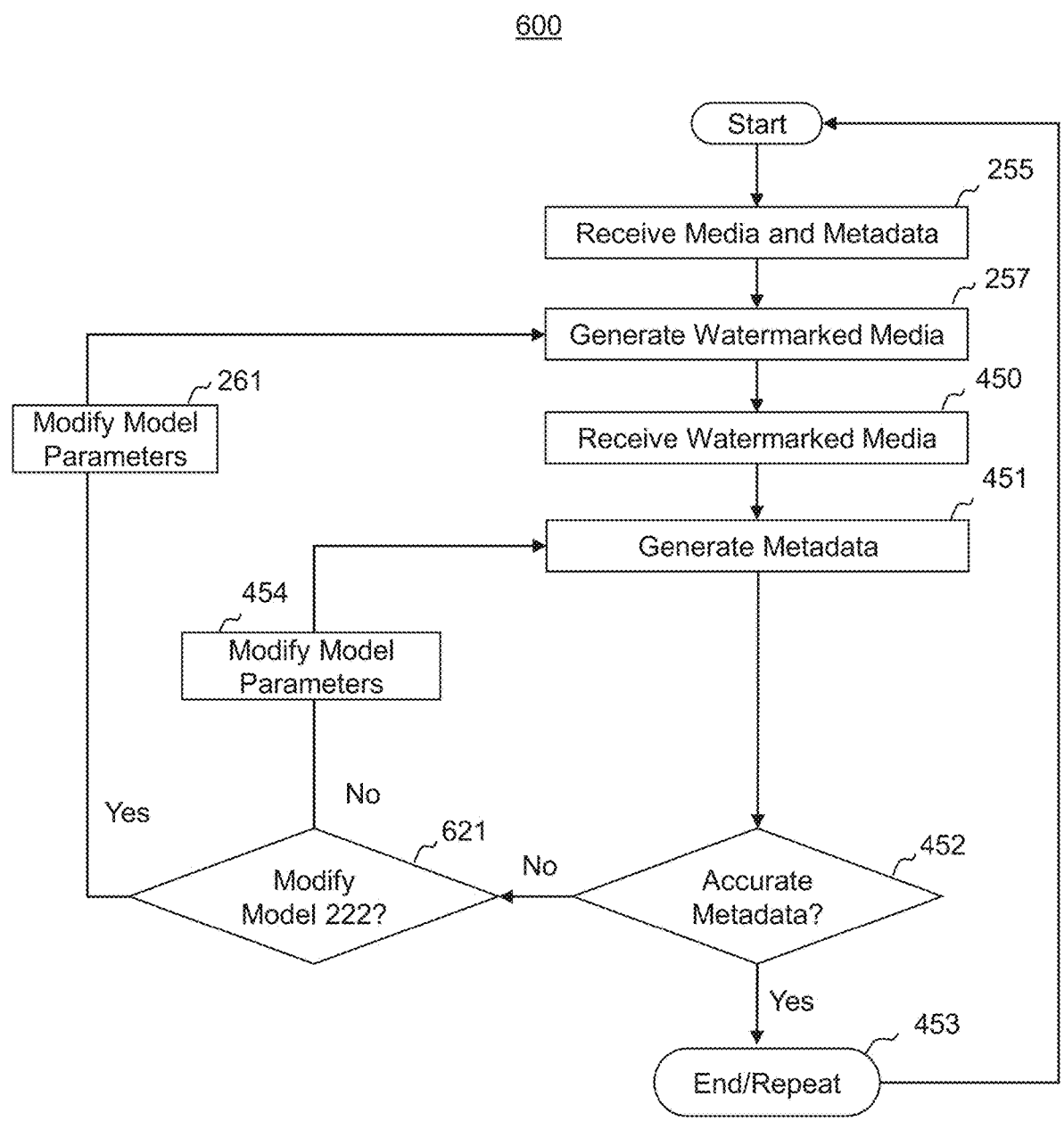
FIGS. 6A and 6B are illustrative processes of modifying parameters of an identifier and a generator consistent with disclosed embodiments.

It should be noted that the failure of identifier 401 to output accurate metadata 416 may not be due to shortcomings of identifier 401, but may it be due to the failure of generator 222 to generate an adequate watermarked content 224 (as shown in FIG. 2C) that can be processed by identifier 401. In an example embodiment, generator 222 and identifier 444 may be trained concurrently, as shown in FIG. 6A by a process 600. Steps 255, and 257 of process 600 are the same as the corresponding steps of flow diagram 202, as shown in FIG. 2C and steps 450, 451, and 453 are the same as the corresponding steps of process 500, as shown in FIG. 5. Step 452 of process 600 is different from the similar step of process 500 in the case when generated metadata 416 is not accurate (step 452, No). In such a case, process 600 may proceed to step 621 that determines whether or not generator 222 requires modifications. If generator 222 requires modification (step 621, Yes) process 600 may proceed to step 261 that may be the same as step 261 of flow diagram 300. If generator 222 does not require modification (step 621, No), process 600 may proceed to step 454 for modifying identifier 401. Step 454 may be the same as step 454 of process 500. In an example embodiment, the decision on whether or not generator 222 requires modifications may depend on a number of attempts at modifying identifier 401 at step 454. For example, if a number of attempts exceed a predetermined threshold value, step 261 may need to be performed. Additionally, or alternatively, the decision on whether or not generator 222 requires modifications may depend on how quickly identifier 401 may be trained. If for example, it is determined that identifier 401 accuracy is increasing with training at a rate that is lower than a predetermined rate, step 261 may need to be performed.

Figure 6B:
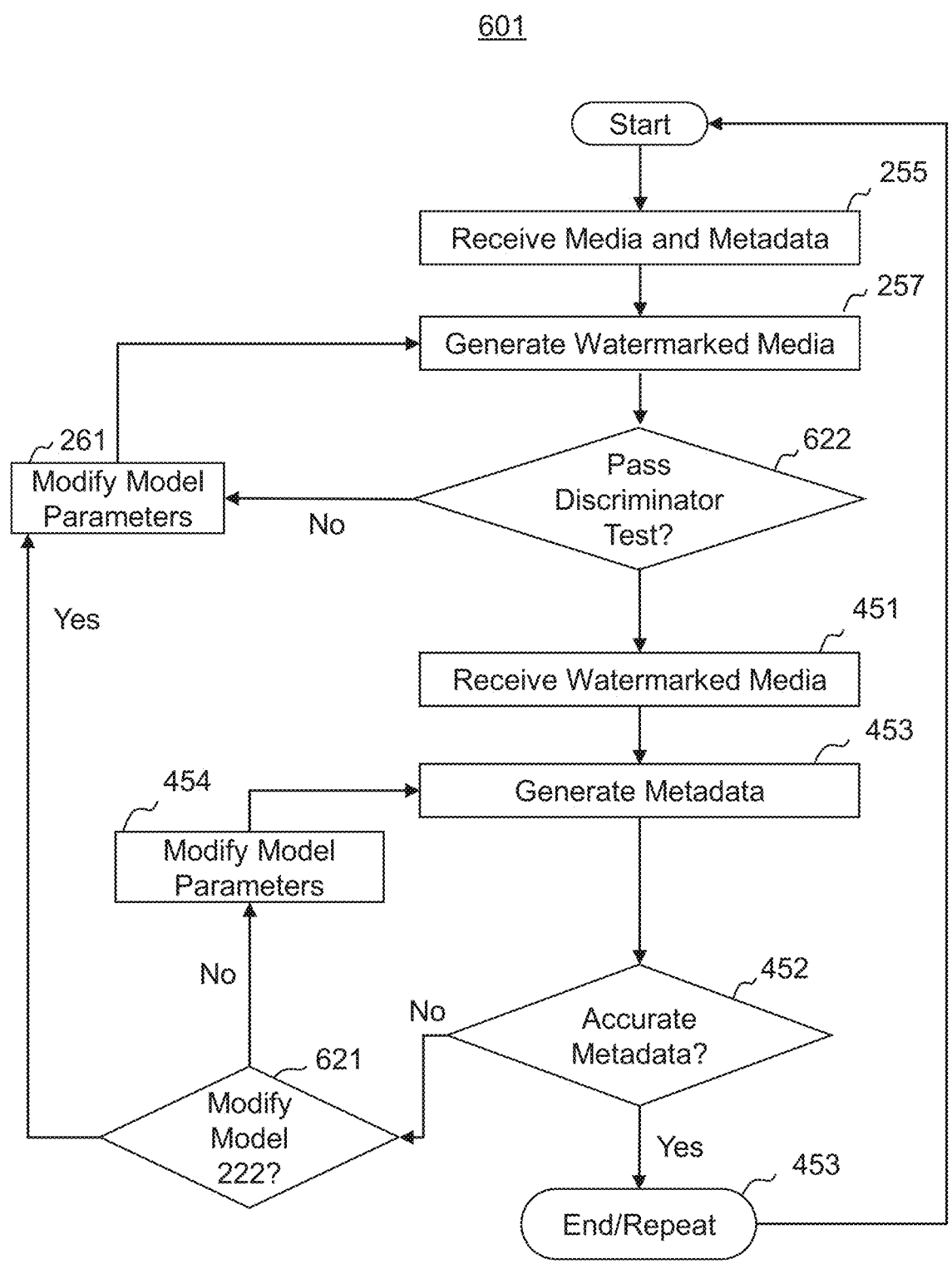

FIG. 6B shows a process 601 that is a variation of process 600. Process 601 includes all the same steps as process 600 (e.g., steps 255, 257, 451, 453, 452, 453, 621, 454 and 261). Additionally, process 601 includes a step 622 for verifying that modifications to generator 222, due to modifications in generator parameters at step 261, do not affect a generator 222 property of generating the watermarked content that can pass a discriminator test. In an example embodiment, at step 622 the watermarked content is input to discriminator 212 and discriminator 212 determines whether the watermarked content is unaltered (e.g., discriminator 212 returns one of classification labels 214A or 214B where label 214A may be "TRUE" indicating that the video signal is not altered, and label 214B may be "FALSE" indicating the video signal has been altered). If the content is determined to be unaltered (step 622, Yes), process 601 may proceed to step 451. If the content is determined to be altered (step 622, No), process 601 may proceed to step 261 and make additional modifications to parameters of generator 222.

In various embodiments, generator 222, and discriminator 212 may be part of any suitable machine-learning approaches. For example, generator 222, and discriminator 212 may be part of a generative adversarial neural network such as GAN or deep convolutional-GAN. Additionally, generator 222, discriminator 212, and identifier 401 may form an InfoGAN. For example, generator 222 may be a deep convolutional neural network, and discriminator 212 and identifier 401 may be a combined neural network (e.g., identifier 401 may be an additional fully connected layer of discriminator 212) allowing for determining a device identification.

In various embodiments, watermarked content is configured to withstand to distortions associated with encoding (e.g., compression of the media content) as well as common content manipulations (e.g., cropping, resizing, and the like) or active attacks, as described above. In an example embodiment, shown in FIG. 7, the watermarked content may be subjected to a distorter 711. Distorter 711 may be a machine-learning method configured to receive content and distort the content. In an example embodiment, distorter 711 may be a convolutional neural network, or any other suitable neural network. Distorter 711 may be configured to output a distorted content that passes a discriminator test (i.e., discriminator 212 classifies the distorted content as content that is not altered as compared to other similar content). In a flow diagram 700 shown in FIG. 7, one or more watermarked records (e.g., content 224A and content 224B) is input into distorter 711 at step 450A. In various embodiments, content 224A and content 224B may correspond to the same record but contain a different digital watermark. For example, content 224A corresponding, for instance, to a particular video signal may be streamed to a first user device (e.g., device 151, as shown in FIG. 1) and content 224B corresponding to the same video signal may be streamed to a second user device (e.g., device 152 as shown in FIG. 1). Content 224A and content 224B may be configured to contain different digital watermarks as the digital watermarks may uniquely depend on identifiable information for device 151 and device 152.

In various embodiments, distorter 711 may be a machine learning model. In an example embodiment, distorter 711 may be a collection of various models, with each model designed to distort a media content in a defined way that can simulate typical distortions, and/or distortions that may be used in an active attack. At step 450B, distorter 711 may output a distorted content 225 that, in some cases, may include data obtained by combining content 224A and 224B. It should be noted that content 224A and content 224B are only illustrative, and a larger number of watermarked multimedia records may be used to provide combined distorted content 225. Alternatively, a single watermarked content (e.g., content 224A) may be used by distorter 711 to provide distorted content 225. At step 450C of flow diagram 700, distorted content 225 may be input to identifier 401 to determine if metadata 416 extracted from distorted content 225 at step 451 accurately matches metadata 216, as shown in FIG. 2C. If metadata 416 does not match data 216, then distorter succeeded in attacking the watermarked content (e.g., content 224A and content 224B).

Distorter 711 may be trained (or calibrated) in order to ensure that distorted content 225 is similar to the watermarked content 224A (or content 224B) in order for content 225 to be a legitimate duplicate of content 224A. In an example embodiment (not shown in FIG. 7), content 225 may be compared to content 224A using any suitable image quality assessment (IQA) measure such as (SSIM, VMAF, PSNR, and the like). If content 225 is dissimilar from content 224A as concluded, for example, when the IQA measure is above a predetermined threshold value, distorter 711 may need to be adjusted. In an example embodiment, when distorter comprises a neural network, the weights of the neural network may need to be adjusted.

Figure 7:
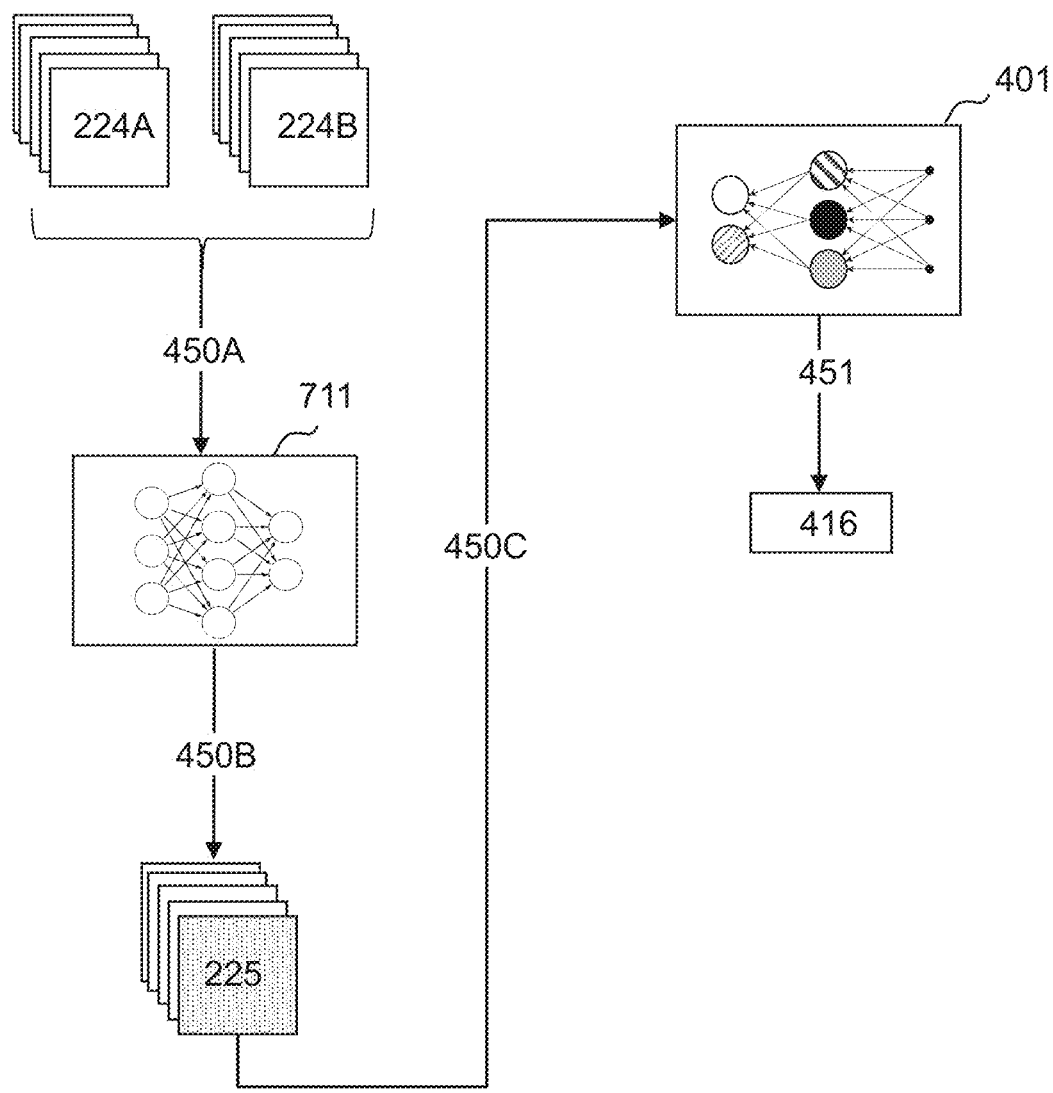
FIG. 7 is an illustrative diagram describing the use of a distorter consistent with disclosed embodiments.
Figure 8:
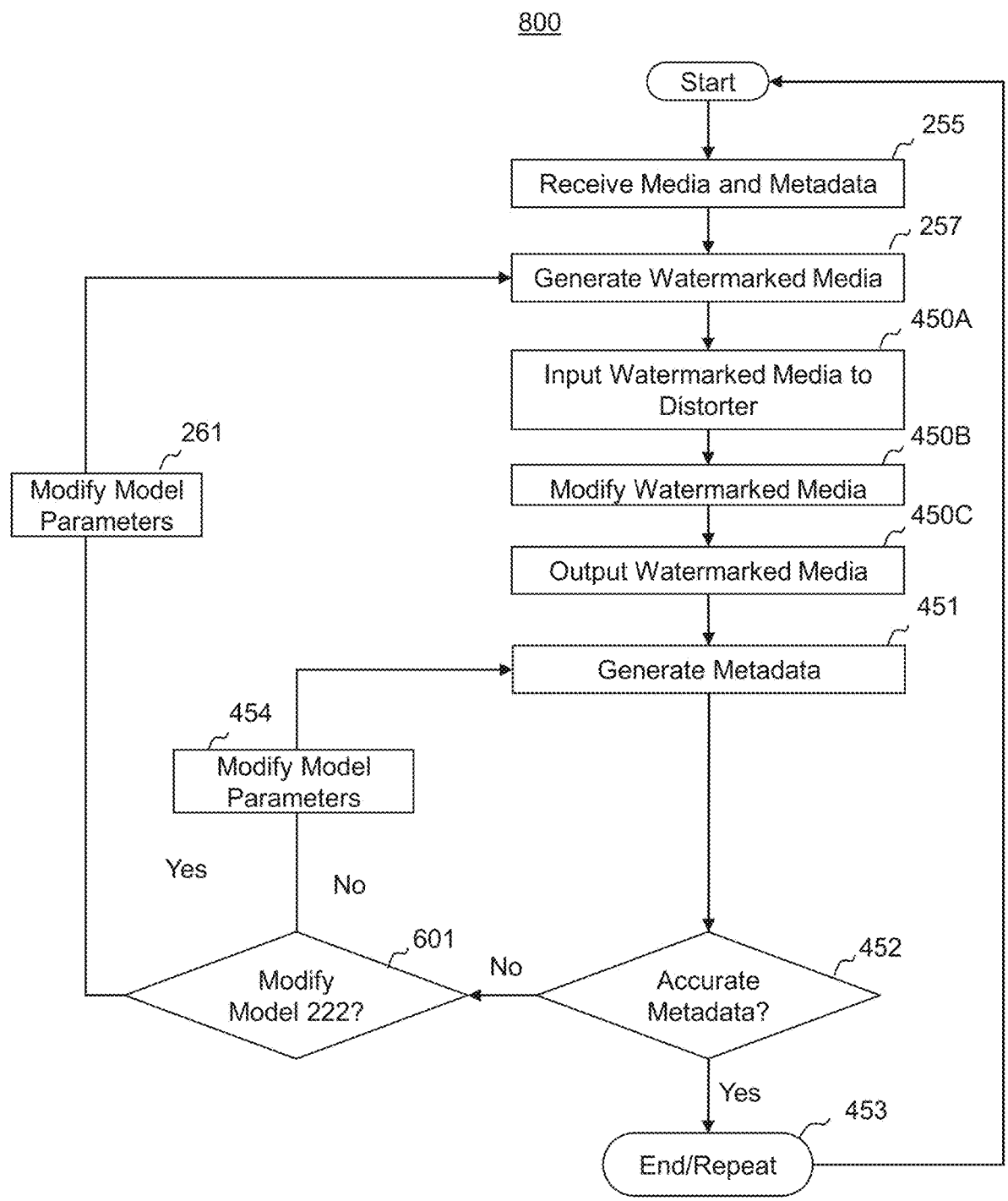
FIG. 8 is an illustrative process of modifying parameters of an identifier and a generator consistent with disclosed embodiments.

FIG. 8 illustrates an example process 800 for training generator 222 and identifier 401 that is similar to process 600 shown in FIG. 6A. For example, steps 255, 257, 451, 452, 453, 621, 454, and 261 of process 800 are the same as corresponding steps of process 600. Additionally, process 800 includes steps 450A-450C that are the same as step 450A-450C of flow diagram 700, as shown in FIG. 7. Incorporating these steps in process 800 facilitates the training of generator 222 and identifier 401 to withstand possible attacks produced by distorter 711. For example, using process 800, as shown in FIG. 8, generator 222 may be trained to generate watermarked content at step 257, distorter 711 may receive the watermarked media at step 450A, and modify the media at step 450B. At step 450C distorter 711 may transmit the watermarked media to identifier 401.

Figure 9:
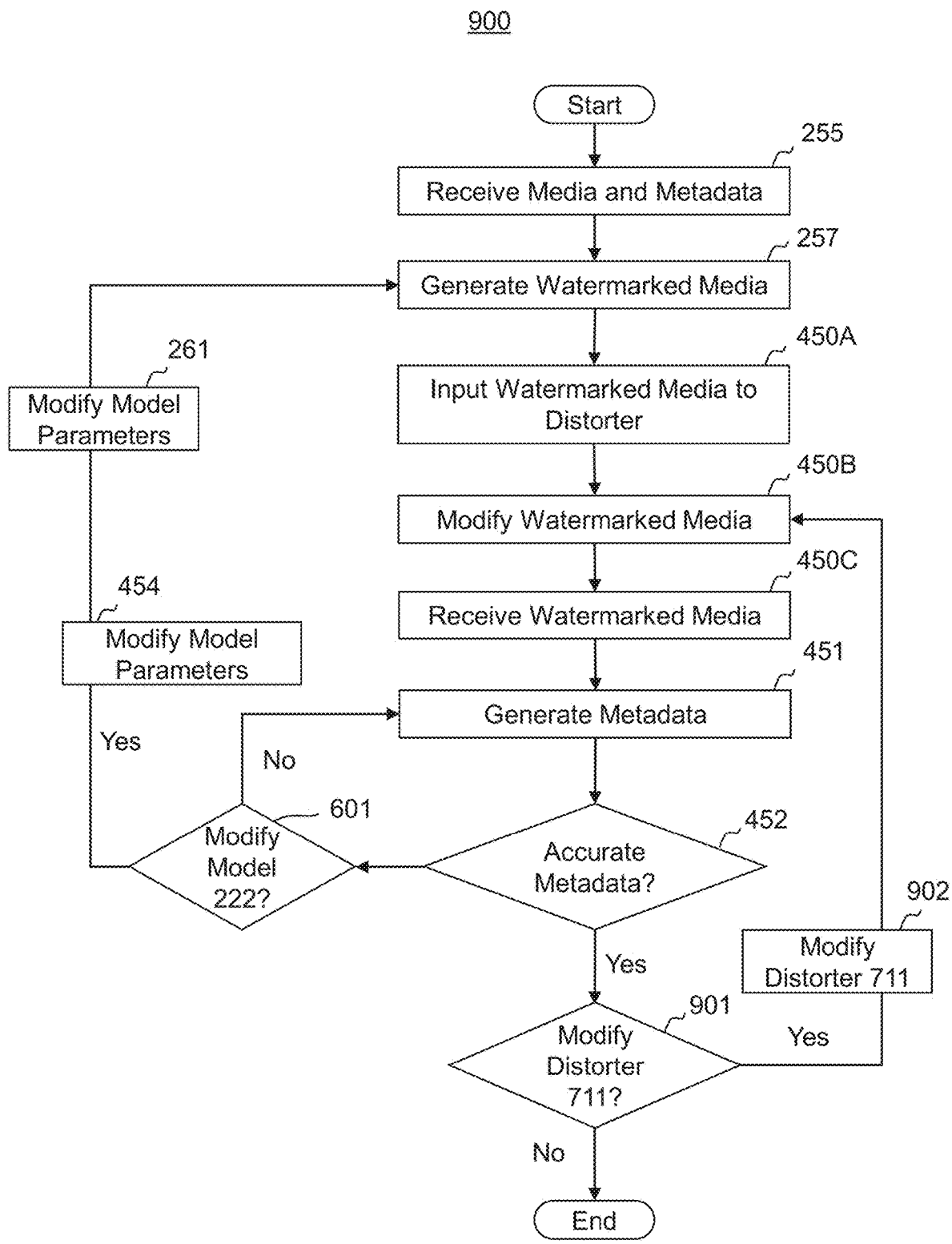
FIG. 9 is an illustrative process of modifying parameters of an identifier, a generator, and a distorter consistent with disclosed embodiments.

FIG. 9 illustrates an example process 900 for training generator 222, and identifier 401 subject to various possible watermarked media distortions due to the presence of one or more distorters 711 with variable parameters. Process 900 is similar to process 800. For example, steps 255, 257, 451, 453, 621, 454, 261, and 450A-450C of process 900 are the same as corresponding steps of process 800. At step 452, if metadata 416 output by identifier 401, as shown in FIG. 4, is the same as the original metadata 216 (step 452, Yes), process 900 may test if distorter modification is necessary at step 901. If distorter 711 needs modification (step 901, Yes), process 900 may proceed to step 902 and modify distorter 711. After completion of step 902, process 900 may proceed to step 450B and modify the watermarked content using modified distorter 711.

In various embodiments, distorter 711 may include several predetermined distortion models. For example, a first distortion model may generate distortions due to multimedia cropping, the second distortion model may generate distortions due to multimedia resizing, the third distortion model may generate distortions by a collusion attack, as described above, the fourth distortion model may generate distortions using data encoding methods that result in lossless or lossy compressed content, and the like. In an example embodiment of step 902 of process 900, the modification of distorter 711 may amount to choosing a different distortion model than the previously used distortion model. For example, if at step 450B, the fourth distortion model has been used, at step 902, the second distortion model may be chosen, and step 450B may be repeated, as shown in FIG. 9.

The decision of whether to modify a distorter (step 901, Yes) may depend on a number of distortion models tried. For example, if all of the predetermined distortion models have been tried, process 900 may determine at step 901 that distorter 711 may not need any more modifications.

In some embodiments, distorter 711 may include methods containing tunable parameters such as machine-learned methods (e.g., neural networks). At step 902, the parameters of distorter 711 may be modified. For example, for cases when distorter 711 is a neural network, weights of the neural network may be modified. In some cases, similar to process 601, as shown in FIG. 6B, process 900 and/or process 800 may include step 622 (as shown in FIG. 6B, but not shown in FIG. 8 or FIG. 9) for verifying that the watermarked content generated by a modified generator 222 passes the discriminator test.

Figure 10:
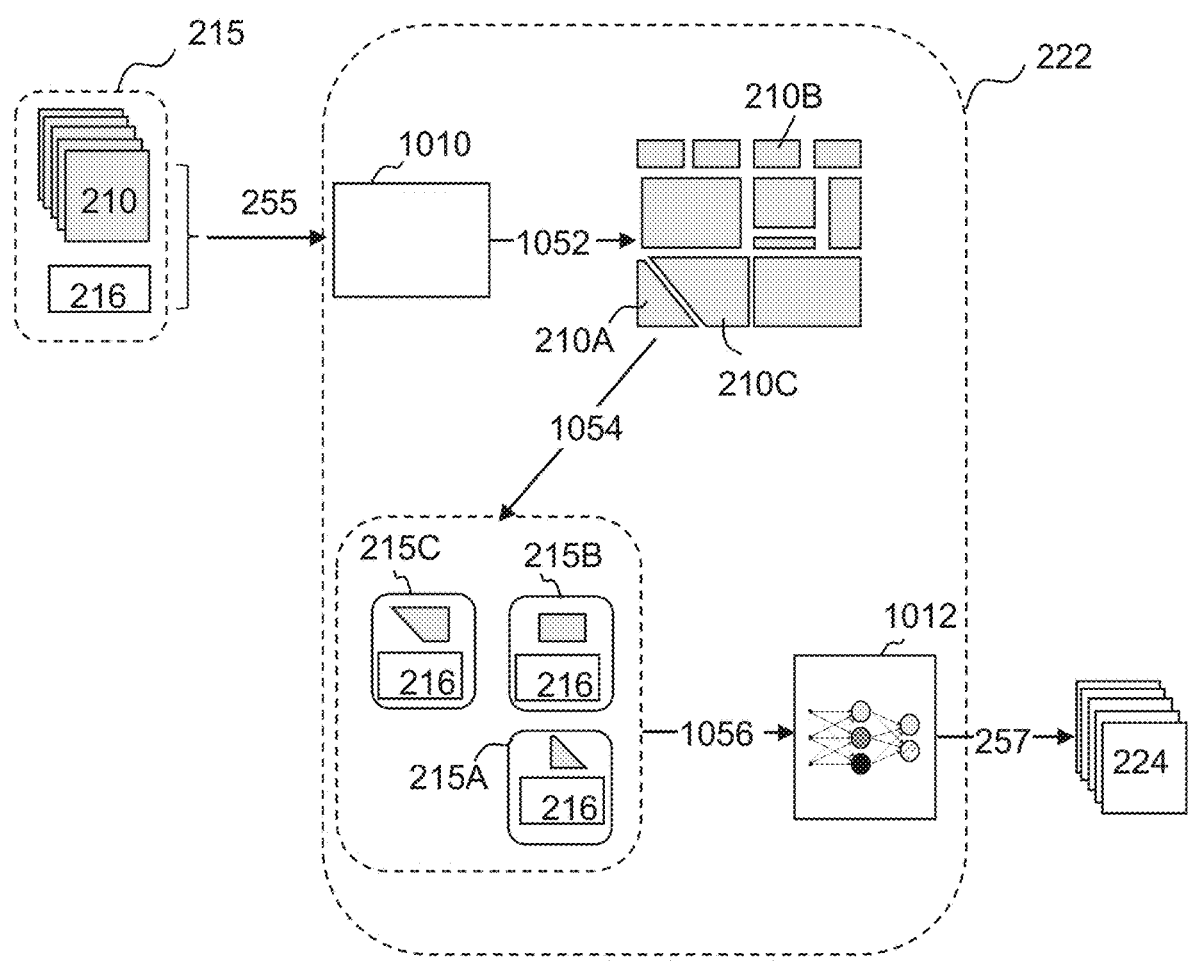
FIG. 10 is an illustrative diagram for generating watermarked content consistent with disclosed embodiments.

It should be noted that while generator 222, discriminator 212, distorter 711 and identifier 401 may be machine-learning methods, in various embodiments, some of these computer-based models may be a combination of various machine-learning methods. In various embodiments, a computer-based model may include multiple models interacting with one another. For example, FIG. 10A shows a flow diagram 1001 describing watermarking media content 210 using generator 222. Diagram 1001 is similar to diagram 202, as shown in FIG. 2C, with the difference that generator 222 includes multiple computer-based models such as model 1010 and 1012 for generating watermarked media content 224. Diagram 1001 includes steps 255 and 257 that are the same as the corresponding steps of diagram 202. In an example embodiment, model 1010 may be configured to split the content 210 into segments (e.g., 210A-210C, and the like). In some embodiments, when content is a video signal, different video frames may be split according to any suitable rule of model 1010. In an example embodiment, model 1010 may be configured to receive a "split rule key" that determines how to split the content. At step 1052, model 1010 may split the content, and various split segments (e.g., 210A) may be watermarked separately. For example, at step 1054 of flow diagram 1001, some of the split segments (e.g., 210A-210C, and the like) may be combined with metadata 216 to form data 215A-215C for computer-based model 1012. At step 1056, data 215A-215C may be input to model 1012, and at step 257, model 1012 may output watermarked content 224.

It should be noted that model 1012 may select some of the segments for embedding a digital watermark within the segments, and may not watermark the segments that are not selected. It should be also noted that the digital watermark for different segments may be the same, or some segments may include digital watermarks that are different from one another. In an example embodiment, segments may contain a first or the second type of a digital watermark. For example, the first type of watermark may correspond to a first type of information (e.g., may correspond to a bit "1") and a second type of watermark may correspond to a second type of information (e.g., may correspond to a bit "0"). In an example embodiment, the first type of watermark may be an array of bits $A_1$, (e.g., an array of ones and zeros), and the second type of watermark may be a complemental array of bits $A_2$ such that $A_1+A_2=A_3$, where the array $A_3$ contains only an array of ones, and the sum of arrays $A_1$ and $A_2$ includes the addition of the elements of these arrays.

An example embodiment described above is only illustrative, and more/fewer types of digital watermarks may be generated. Additionally, some of the segments may contain several types of digital watermarks, while some of the segments may not contain any watermarks. Furthermore, some of the segments may contain a digital watermark that is not repeated in any other segment. Additionally, or alternatively, a plurality of watermark types may be embedded within various segments. In an example embodiment, a watermark type may have parameters that may be adjusted depending on a segment in which the watermark of that type is embedded. For example, a watermark may be an array of numbers that may be collectively modified (e.g., all the numbers are multiplied by two) depending on a segment in which the watermark of that type is embedded. For instance, if numbers determine colors of pixels within a first segment of an image, the colors may be adjusted collectively (e.g., by increasing a blue color component) when embedding the watermark of that type within a second segment of the image.

Generally, there may be several approaches for inserting a digital watermark in video content. A first approach may include inserting a device identification (e.g., a machine identification number) multiple times in a frame of video content. The device identification may be inserted in multiple spatially separated parts of the frame of video content. In an example embodiment, identifier 401, may determine the device identification by analyzing a portion of the frame of the video content.

A second approach may create a first frame (frame A) and a second frame (frame B) with a one-bit difference between the frames. Frame A may correspond to a bit 1, and frame B may correspond to a bit 0. To encode a device identification, sequences of frames A and B may be used (e.g., ABBABA-BAA) that may correspond to a device identification number 100101011.

While the first approach may be computationally intensive (e.g., may lead to scalability issues if executed by server 110, as shown in FIG. 1) and may require complex processing to produce watermarks that are not visually detectable (e.g., the first approach may require machine-learning methods such as InfoGANs, convolutional neural networks, and the like), it presents a robust approach and reduces a possibility of a collusion attack (that is, a kind of attack when several versions of the content are used to make combined content). In contrast, the second approach may be prone to collusion attacks as it takes removal or altering of one or a few frames to change the device identification information contained in the watermarked video content. The present disclosure provides a robust watermarking method that is resilient to various attacks, including the collusion attacks. To address problems associated with computational complexity and scalability, a process of digitally watermarking video content using the first approach may be implemented on an edge computing system (e.g., system 133), as system 133 includes sufficient processing power (thus addressing a problem of computational load) and serves a limited number of user devices (thus addressing a problem of scalability).

Figure 11:
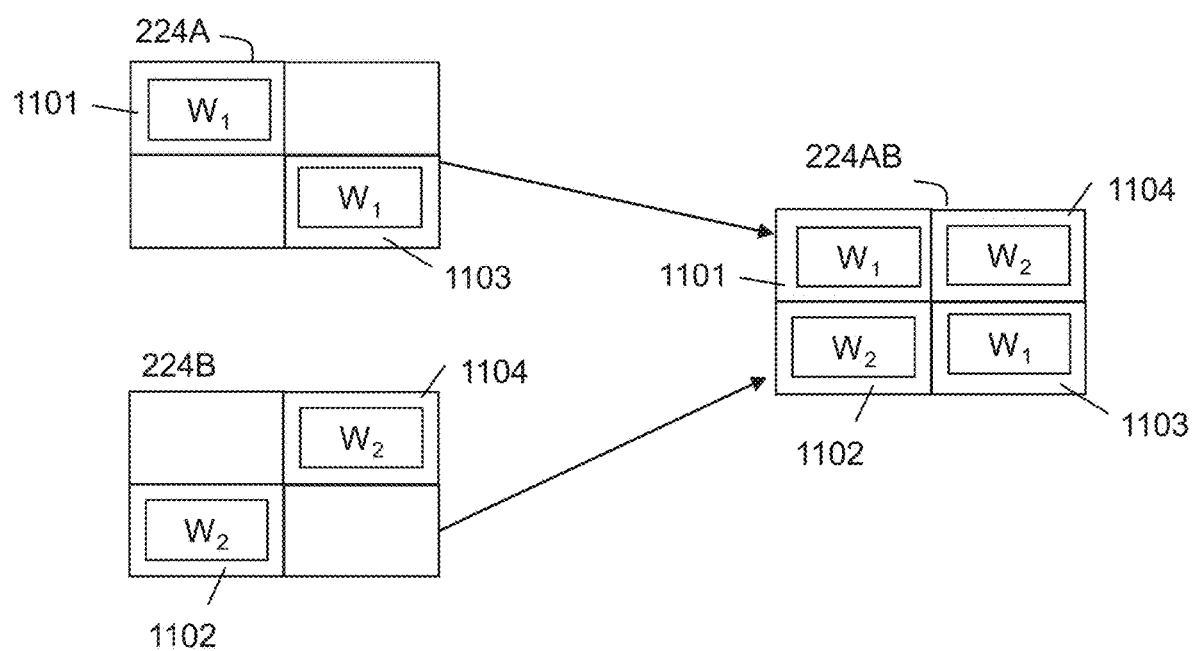
FIG. 11 is an illustrative diagram for combining watermarked content consistent with disclosed embodiments.

For example, FIG. 11 shows a process of combining segments 1101 and 1103 of content 224A containing a digital watermark $W_1$ and segments 1102 and 1104 of content 224B containing a digital watermark $W_2$ to generate combined content 224AB. The combined content contains the two watermarks $W_1$ and $W_2$, as shown in FIG. 11. By placing the watermarks $W_1$ and $W_2$ in separate segments of content 224AB, identifier 401 may be configured to determine that both watermarks are present within content 224AB. The process shown in FIG. 11 describes separating watermarks $W_1$ and $W_2$ spatially within content when digital watermarks are embedded directly into the content. In some embodiments, however, the content may first be transformed prior to embedding a watermark. Various transformations for the content may include a scramble transformation, that may include perturbing data of the content according to a set of specific rules. In some cases, the rules may include random perturbations mapped to random numbers generated by a random number generator for a given key number. Additionally, or alternatively, the content may be transformed into a frequency domain using, for example, a fast Fourier transform. Other transformations may include a wavelet transform, SVD transform, and the like.

Figure 12A:
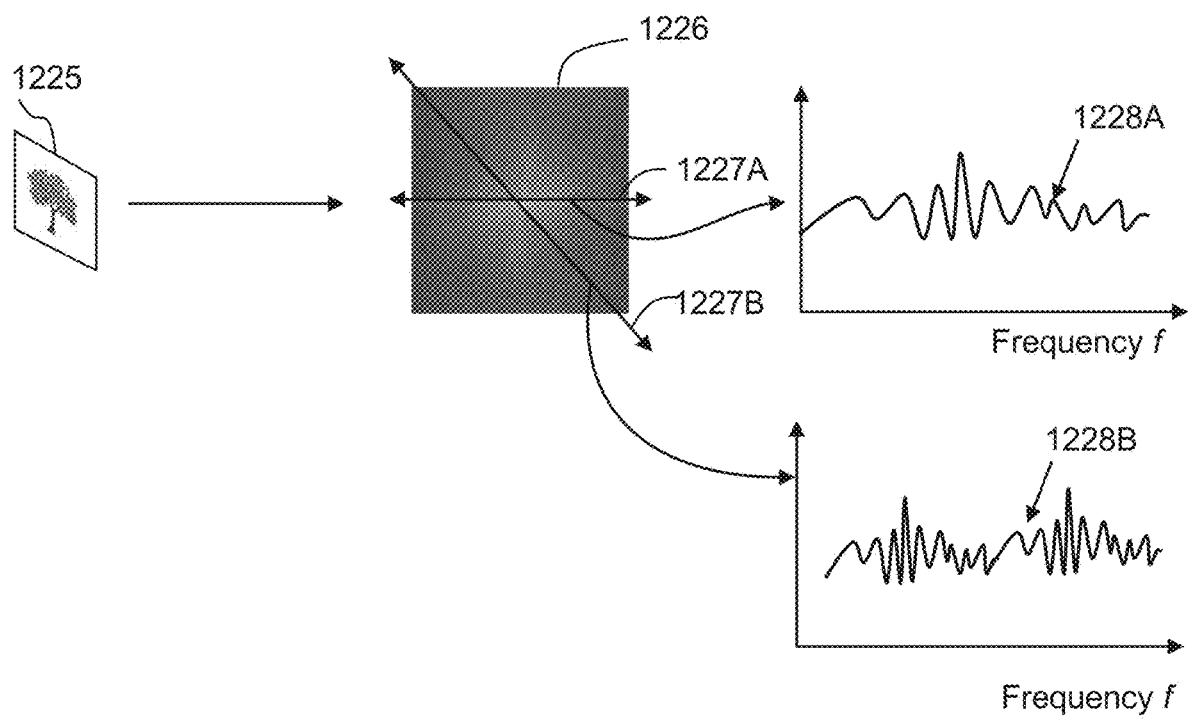
FIG. 12A is an illustrative Fourier transform of image data.
Figure 12B:
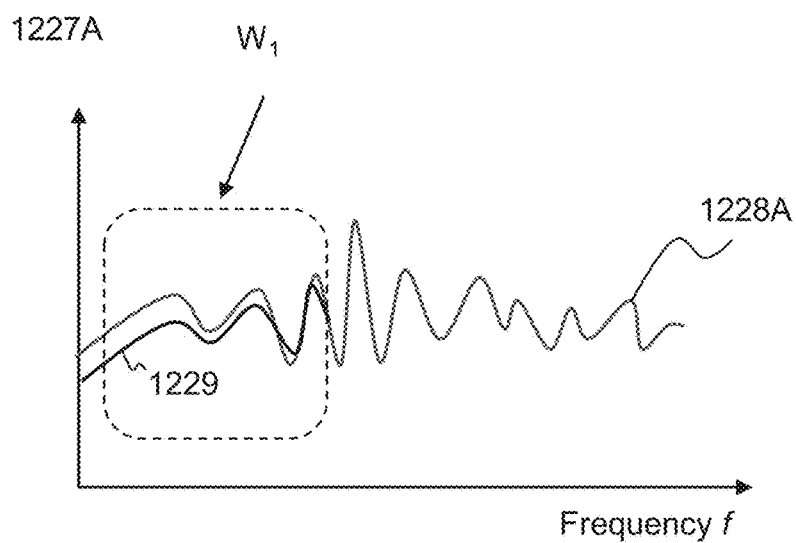
FIGS. 12B-12C are illustrative plots of a Fourier transform modified by embedding one or more watermarks consistent with disclosed embodiments.
Figure 12C:
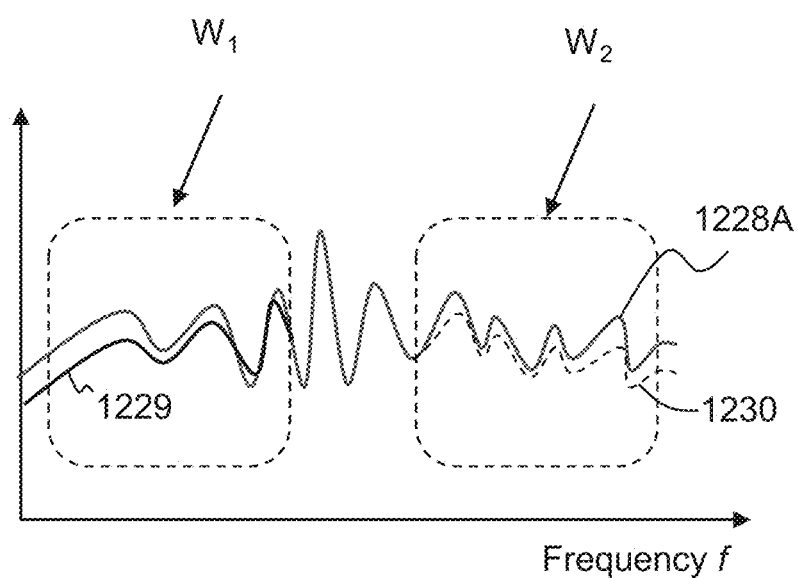

FIG. 12A shows an example transformation of multimedia content 1225A in the frequency domain as shown by two-dimensional region 1226. One-dimensional cross-sectional cuts 1227A and 1227B are illustrated by double arrows plotted over region 1226, and corresponding one dimensional Fourier transforms 1228A and 1228B are shown adjacent to region 1226. In an example embodiment, a digital watermark may be embedded by modifying the amplitude of the Fourier transform. For example, FIG. 12B shows Fourier transform 1228A that includes a first modification due to watermark $W_1$ shown by curve 1229. FIG. 12C shows Fourier transform 1228A that is modified to include two embedded watermarks $W_1$ and $W_2$ corresponding to changes in Fourier transform 1228A indicated by curves 1229 and 1230. The Fourier transform 1228A containing two watermarks $W_1$ and $W_2$ may be for multimedia content obtained by combining two different versions of the multimedia content having different watermarks. For example, multimedia content 224A, as shown in FIG. 11, may be watermarked with watermark $W_1$ and delivered to a first user device, and multimedia content 225B, as shown in FIG. 11, may be watermarked with watermark $W_2$ and delivered to a second user device. Then, combined multimedia content 224AB may have a Fourier transform as shown in FIG. 12C. It should be noted that when watermarks $W_1$ and $W_2$ are not overlapped, as shown in FIG. 12C, identifier 401 may detect both of the watermarks and provide metadata 216 for each watermark. In such a case, both the first and the second user device may be determined to distribute the multimedia content. It should be noted that separation of watermarks $W_1$ and $W_2$ is only illustrative and, in some embodiments, identifier 401 may detect metadata 216 associated with each watermark $W_1$ and $W_2$ even when watermarks overlap. It should also be noted that watermarks $W_1$ and $W_2$ may be incorporated into Fourier transforms along different one-dimensional cross-sectional cuts, such as cuts 1227A and 1227B. For example, watermark $W_1$ may modify Fourier transform 1228A along cut 1227A, and watermark $W_2$ may modify Fourier transform 1228B along cut 1227B.

Figure 13:
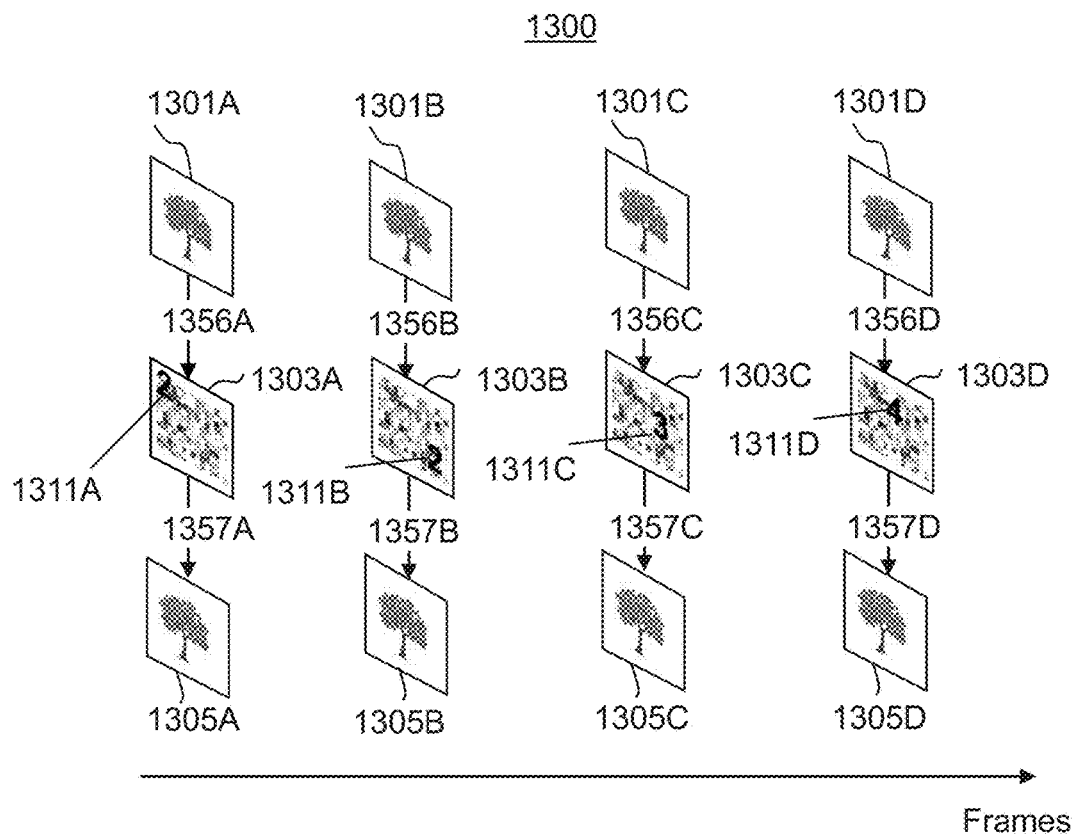
FIG. 13 is an illustrative flow diagram describing a process of watermarking a video signal containing multiple image frames consistent with disclosed embodiments.

FIG. 13 shows an example process of watermarking a video signal illustrated in flow diagram 1300. In an example embodiment, the video signal may contain image frames 1301A-1301D. At steps 1356A-1356D, image frames 1301A-1301D may be scrambled using any suitable scramble approach as described above. After scrambling the image frames, digital watermarks (e.g., a watermarks 1311A-1311D) may be embedded resulting in scrambled watermarked image frames 1303A-1303D. At steps 1357A-1357D, scrambled frames 1303A-1303D may be unscrambled, resulting in watermarked frames 1305A-1305D. In various embodiments, digital watermarks may be placed at a different location in different frames (e.g., watermark 1311A is placed at the top corner of image frame 1303A, and watermark 1311B is placed at the bottom corner of image frame 1303B). In various embodiments, embedded digital watermarks may be different between frames. For example, watermark 1311C is different from watermark 1311D.

Figure 14:
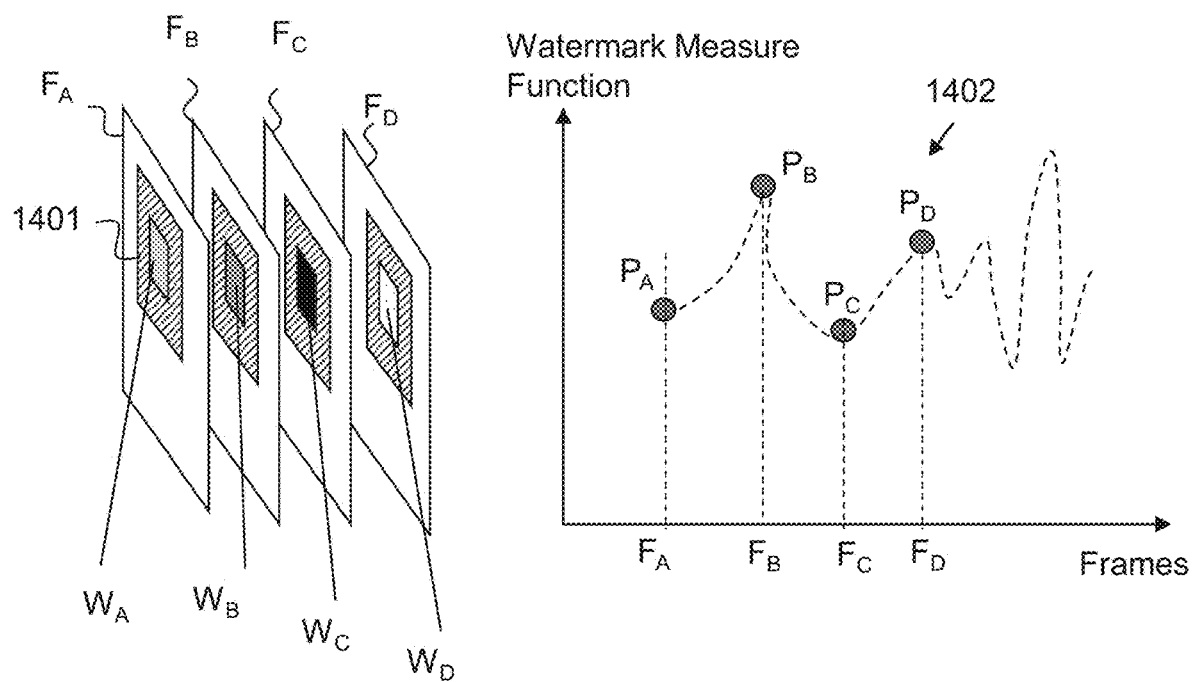
FIG. 14 is an illustrative diagram and a graph describing a process of watermarking a video signal containing multiple image frames consistent with disclosed embodiments.

FIG. 14 shows an illustrative embodiment of watermarking a video signal containing multiple frames $F_A$-$F_D$, the frames watermarked with watermarks $W_A$-$W_D$. In various embodiments, frames $F_A$-$F_D$, may be watermarked at a region 1401 which may be substantially unchanged between the frames (e.g., the region 1401 may correspond to a background region of a news channel that is substantially unchanged among image frames $F_A$-$F_D$). While region 1401 may be unchanged, watermarks $W_A$-$W_D$ may contain information that may change from one frame to another. For example, if watermarks $W_A$-$W_D$ include a single number, the number may change from one frame to another. For cases when watermarks $W_A$-$W_D$ are represented by array of numbers, e.g., $W_A = \{w_1^A, w_2^A \ldots w_N^A\}$, a measure function M may be defined that may correspond a single number to a set of numbers $\{w_1^A, w_2^A \ldots w_N^A\}$. Measure function M may be defined in any suitable way (e.g., $M = \Sigma w_i^2$). FIG. 14, shows a plot 1402 that for frames $F_A$-$F_D$ plots point values $P_A$-$P_B$ of a measure function M calculated for corresponding watermarks $W_A$-$W_D$. In an example embodiment, changes in measure function M between frames may be used to encoded any suitable information (e.g., identifiable information about a user device or any suitable information contained in metadata 216, as shown, for example, in FIG. 2C). In an example embodiment, information may be encoded by generating a signal using Fourier series with information encoded using coefficients of the Fourier series, or any other suitable series of orthogonal functions.

Figure 15:
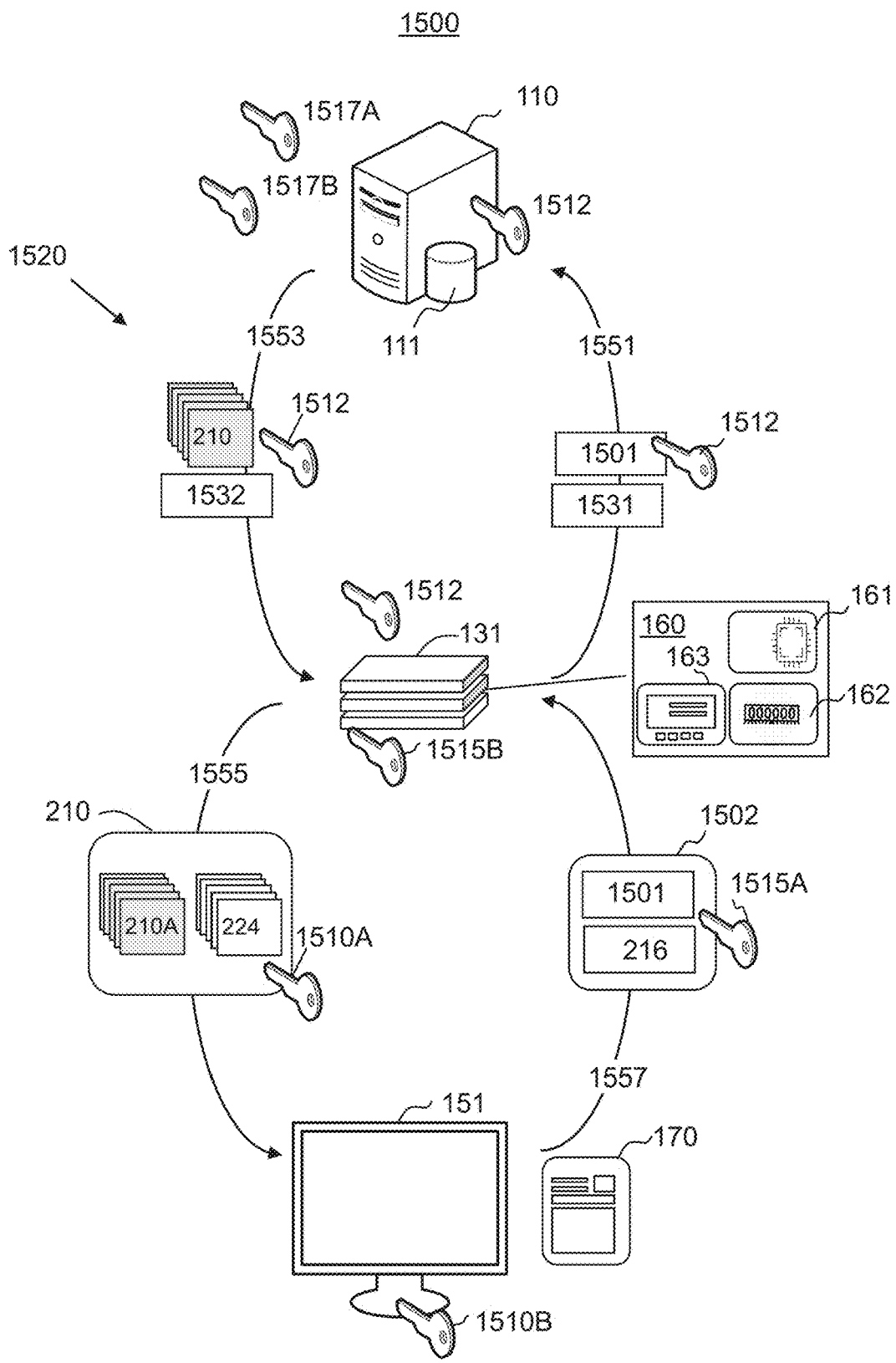
FIG. 15 is an illustrative system for streaming and watermarking content using secure communication consistent with disclosed embodiments.

As described above, content processing system 160 may be part of a network system for distributing multimedia content. An example network system 1520 is shown in FIG. 15. FIG. 15 shows a flow diagram 1500 for exchanging data and multimedia content between components of system 1520. In various embodiments, system 1520 includes server 110 (also shown in FIG. 1), edge computing system 131 (also shown in FIG. 1) and user device 151 (also shown in FIG. 1). Edge computing system 131 includes content processing system 160 (also shown in FIG. 1) that includes at least one processor 161, memory 162, and input interface 163 for modifying programming instructions and controlling various parameters of system 160.

In an example embodiment, user device 151 may communicate with server 110 and may be configured to request multimedia content from server 110. For example, user device 151 may be subscribed to a service that allows device 151 authenticate with server 110, request from server 110 multimedia content, and receive from server 110 the requested content. In an example embodiment, user device 151 may include an application 170 for facilitating communication with server 110. For instance, application 170 may allow authentication of user device 151, selection of media content to be received by user device 151, and playback control (e.g., control on whether to stop, skip, or replay a video signal, and the like).

In an example embodiment, at step 1557, application 170 of user device 151 may submit an encrypted request 1502 to edge computing system 131, Request 1502 may include content-related data 1501 (e.g., a content identification, such as a content title), as well as metadata 216 that contains identifiable information about device 151. Additionally, or alternatively, metadata 216 may include identifiable information about a user of the device, and/or account of the user. In an example embodiment, request 1502 may be encrypted using a public key 1515A of edge computing system 131. System 131 may decrypt request 1502 with a private key 1515B. Metadata 216 may be stored in memory 162 associated with edge computing system 131, and media related data 1501 may be encrypted using a key 1512 associated with server 110 and edge computing system 131. Data 1501 may then be transmitted to server 110 at step 1551. Additionally, at step 1551, a user device related information 1531 may be transmitted to server 110, encrypted using key 1512. In various embodiments, encryption between server 110 and edge computing system 131 may be symmetric.

Server 110 and edge processing system 131 may have one or more encryption keys. For example, edge processing system 131 may include a private key 1515B and a key 1512 for encrypting data (e.g., content 210) for transmission between system 131 and server 110. In an example embodiment, server 110 may have a public key 1517A and a private key 1517B for interacting with devices other than edge computing system 131 (e.g., user device 151). Alternatively, server 110 may not be configured to transmit information to devices other than edge computing systems. In various embodiments, server 110 may send content to multiple edge processing systems using multicasting. In an example embodiment, request 1502 may contain data 1501 encrypted with a public key 1517A, and metadata 216 encrypted with public key 1515A. Metadata 216 may be decrypted by edge computing system 131 (e.g., by processors 161 of system 160) using private key 1515B, and stored in memory 162, while data 1501, previously encrypted with public key 1517A, may be transmitted to server 110. Server 110 may decrypt data 1501 using a private key 1517B, determine a type of request (e.g., request for a video signal) based on data 1501, retrieve multimedia content from a database 111, and encrypt content 210 using key 1512. Alternatively, in an example embodiment, prior to encrypting content 210, content 210 may be split into a first and a second section. For example, when content is a video signal, the first section may include a first set of image frames, and a second section may include a second set of image frames. In an example embodiment, the first section may be encrypted using public key 1510A associated with user device 151, and the second section may be encrypted using key 1512.

At step 1553, encrypted content 210 may be transmitted to edge computing system 131, and may be at least partially decrypted using key 1512. For example, if the entire content 210 is encrypted with key 1512, it may be decrypted using key 1512 in its entirety or a portion of content 210 may be decrypted using key 1512. Alternatively, if the first section of content 210 is encrypted with public key 1510A, and the second section of content 210 is encrypted with key 1512, only the second section may be decrypted. Additionally, at step 1553 a user device related information 1532 may be transmitted to system 131, encrypted using a public key 1515A or key 1512.

In various embodiments, server 110 may encode the entire content 210. For such cases, edge computing system 131 may decode a decrypted portion of content 201, and watermark the decrypted and decoded portion. Alternatively, server 110 may not encode a portion of content 210, and edge computing system 131 may decrypt only the portion of content 210 that is not encoded, watermark the decrypted portion, and encode the watermarked portion. One of the goals of partially decrypting and uniquely watermarking (e.g., forming a watermark containing a user device identification) content 210 by edge computing system 131 is to achieve a high degree of scalability (i.e., allowing edge computing system 131 to serve a large number of user devices 150) for edge computing system 131. In some cases, server 110 may not encode any portion of content 210, and edge computing system 131 may decrypt content 210, watermark the content, and encode the watermarked content.

Edge computing system 131 may receive information 1531 and 210, decrypt information 1531, and at least partially decrypt content 210. For example, edge computing system 131 may decrypt the second section of content 210 if only the second section is encrypted using key 1512. Alternatively, system 131 may decrypt the entirety of content 210 when entire content 210 is encrypted using key 1512. After at least partially decrypting content 210, edge computing system 131 may retrieve metadata 216 corresponding to user device related information 1532, generate one or more digital watermarks containing metadata 216 using system 160, and embed the generated digital watermark (using system 160) into the decrypted section of content 210, resulting in watermarked content 224. In some cases, the entirety of content 210 may be decrypted and watermarked. At step 1555, system 131 may encrypt the watermarked section of content 210 using public key 1510A and transmit the entirety of content 210 to user device 151. In some embodiments, content 210 may contain a first content section 210A that is not watermarked, and second content section 224 that is watermarked, and in some cases, the entirety of content 210 may be watermarked and constitute content 224. After receiving encrypted content 210, application 170 of user device 151 is configured to decrypt content using private key 1510B and recombine content 210A and 224 to form continuous multimedia content that can be continuously played on user device 151. In various embodiments, server 110, edge computing system 131 and application 170 may establish and exchange a set of rules describing how content 210A and 224 are separated, and how content 210A and 224 may be combined to form multimedia content for continuous playback. For example, when content is a video signal, a set of rules may describe that every odd image frame may be watermarked (i.e., be part of content 224). In some embodiments, intraframes (I frames) may be configured to be watermarked. Alternatively, server 110 may use a random number generator with a key seed number to generate a set of frame numbers that require to be watermarked. The key seed number then can be transmitted to system 131 and user device 150 to generate the same set of frame numbers using the same random number generator as used by server 110.

In an example embodiment, when content is a video signal, a subset of frames of the video signal (e.g., I frames) may be transmitted from server 110 to edge computing system 131 without any encryption.

In some embodiments, content 210 may be encoded (e.g., compressed) by server 110 prior to transmitting content 210 to edge computing system 131 and user device 151. For example, when content 210 is a video signal, content 210 may be encoded using a constant bitrate (CBR), an average bitrate (ABR), or a variable bitrate (VBR) encoding. In some cases, content 210 may be encoded using a codec, such as a standard MPEG-4 Part 2, H.264, MPEG-4 AVC, AV1, H.265, or any other suitable codec. In an example embodiment, some of the frames of content 210 may be encoded, and some of the frames (e.g., I frames) may not be encoded. In some cases, the frames that are not encoded may be watermarked by edge computing system 131 (e.g., I frames). The edge computing system 131 may insert a unique device identification in the digital watermarks for these frames.

In some of the embodiments, frames that are not encoded (e.g., I frames) may be encrypted by server 110 using key 1512, and in some cases, these frames may not be encrypted. It should be noted, that any suitable set of frames of the video signal of content 210 may be encrypted and/or encoded by server 110 prior to transmission of content 210 to system 131, while any other suitable set of frames of content 210 be not encrypted, and/or not encoded by server 110 prior to transmission of content 210 to system 131

The disclosed systems and methods may be applicable to multiple content delivery schemes and may be adaptable to different delivery infrastructures. For example, the disclosed systems and methods can be used with multiple encoding, encryption, and packaging technologies. The disclosed methods may be employed with multiple packaging technologies such as common media application format (CMAF), MPEG-DASH, HTTP live streaming (HLS), among others. Further, the disclosed systems and methods may be independent of the streaming mode used by the client. Further, the disclosed systems and methods can operate with any version of HTTP(s) and caching protocols. Furthermore, the disclosed systems and methods may reduce latency and improve user experience by employing architectures that use server caching capabilities. Using cache capabilities within various systems of network system 1520, such as an edge computing system 131, may allow reducing content traffic flow to minimize latency. For example, in the disclosed systems and methods, content may be prepared and preloaded in system 131 located in the proximity of client device 151, thereby improving response times. Such an arrangement of data enables transmission of content with minimal latency.

As described above, network system 1520 may include various devices, such as processors, memory devices, and various client devices. For example, client devices 150 may include one or more computing devices configured to perform one or more operations consistent with disclosed embodiments. For example, client devices 150 may include a desktop computer, a laptop, a server, a mobile device (e.g., tablet, smartphone, etc.), a set-top box, a gaming device, a wearable computing device, or another type of computing device. Client devices 150 may include one or more processors configured to execute software instructions stored in memory, such as memory included in client devices 150, to perform operations to implement the functions related to requesting content, receiving the content and playing the content. Client devices 150 may be configured for wired and/or wireless communications and may include software that when executed by a processor, performs internet-related communication (e.g., TCP/IP) and content display processes. For instance, client devices 150 may execute browser software that generates and displays interfaces including content on a display device included in, or connected to, client devices 150. Client devices 150 may execute applications (e.g., application 170) that allow client devices 150 to communicate with components over network system 1520, and generate and display content in interfaces via display devices included in client devices 150. For example, client devices may display a media player to output content received from edge computing system 131.

The disclosed embodiments are not limited to any particular configuration of client devices 150. For instance, a client device 150 may be a mobile device that stores and executes application 170 to perform operations for requesting, receiving, and playing the content. In certain embodiments, client devices 150 may be configured to execute software instructions relating to location services, such as GPS locations. For example, client devices 150 may be configured to determine a geographic location and provide location data and time stamp data corresponding to the location data to computing system 131 as a part of metadata 216.

Server 110 may include one or more computing systems that perform operations to store and provide content. Server 110 may include databases that include content, such as videos or movies. Server 110 may also include processors that perform authentication functions of client devices 150, users of client devices 150, and/or resolve client identities based on client IDs and/or a secure token. In some embodiments, server 110 may include processors configured to encode content and packet content in different formats. Further, server 110 may include processing devices to resolve URLs. In some embodiments, server 110 may include multiple core processors to handle concurrently multiple operations and/or streams. For example, server 110 may include parallel processing units to concurrently handle requests of multiple client devices 150.

In some embodiments, server 110 may store the original version of content and send copies with different configurations to edge computing system 131. For example, server 110 may compress an original video file and send it to system 131, which may then store it in the cache. In such embodiments, server 110 may allow automatic requests from edge computing system 131. However, in other embodiments, server 110 may implement firewalls that only allow a limited number of pull requests or only allow periodic pull requests to update content. Server 110 may be configured to automatically handle specific requests from edge computing system 131. For example, when edge computing system 131 performs a pull request due to a 'cache miss,' server 110 may be configured to redirect edge computing system 131 to a different memory address. In such embodiments, server 110 may include a relational database, or other similar data structures, to correlate the pull request from edge computing system 131 with an address that has a copy of content. Further, server 110 may include dedicated hardware to perform redirecting operations. For example, server 110 may include a simple risc computer (SRC) architecture, or other reconfigurable computing systems, specifically configured to handle pull requests with 'cache miss.'

Database 111 may include one or more computing devices configured with appropriate software to perform operations for providing content to server 110. Database 111 may include, for example, Oracle™ database, Sybase™ database, or other relational databases or non-relational databases, such as Hadoop™ sequence files, HBase™, or Cassandra™. In an illustrative embodiment, database 111 may include computing components (e.g., database management system, database server, etc.) configured to receive and process requests for data stored in memory devices of the database and to provide data from the database.

Database 111 may be configured to collect and/or maintain the data associated with user accounts and user preferences. For example, database 111 may store information about user privileges. Database 111 may collect the data from a variety of sources, including, for instance, online resources.

Network system 1520 may include any type of connections between various computing components. For example, network system 1520 may facilitate the exchange of information via network connections that may include Internet connections, Local Area Network connections, near field communication (NFC), or other suitable connection(s) that enables the sending and receiving of information between the components of system 1520. In some embodiments, one or more components of system 1520 may communicate directly through a dedicated communication link(s).

As described, above edge computing system 131 may transmit content to user device 151. System 131 may store content in local memories, such as caching infrastructures associated with system 131, local proxies, and/or the HTTP caching capability. In some embodiments, system 131 may perform functions such as routing content, resolving domain systems, handling content requests and creating sessions with client devices for content delivery. System 131 may obtain information from other computing systems (e.g., server 110 or computing system 133, as shown in FIG. 1), arrange it for client devices, and deliver it to client devices 150. In such embodiments, system 131 may be configured to handle multiple streams in parallel, such as providing different data streams to multiple client devices 150. Further, system 131 may be configured to provide authentication credentials to client devices 150. For example, system 131 may provide a secure cookie, or an equivalent technique for authentication, at a session startup time.

In some embodiments, edge system 131 may take the form of a server, a general-purpose computer, a mainframe computer, or any combination of these components. In other embodiments, edge computing system 131 may be a virtual machine. System 131 may be configured to communicate with one or more databases, such as database 111, and other elements of system 1520 either directly or via network connections.

System 131 may include one or more storage devices configured to store instructions used by processors of system 131 to perform functions related to disclosed embodiments. For example, memory storage devices may store software instructions.

In some embodiments, processors of system 131 (e.g., processors 161) may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, processors 161 may be a plurality of devices coupled and configured to perform functions consistent with the disclosure. For example, processors 161 may include a plurality of co-processors, each configured to run specific edge computing system 131 operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like.

It is to be understood that the configuration and the functionality of components of system 1520 have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

In an example embodiment, edge computing systems 132 (as shown in FIG. 1) and server 110 may be part of a wireless network, such as a 5G network, configured to distribute content to user devices 150 (as shown in FIG. 1). Edge computing system 131 may digitally watermark content 210 using content processing system 160 (as shown in FIG. 1). Edge computing system 131 may communicate with server 110 via a secure connection. In an example embodiment, server 110 may encode and encrypt content 210 and transmit it to system 131. Edge computing system 132 may be configured to receive content using multicasting, and each edge computing system (e.g., edge computing system 131) may insert a digital watermark containing an identification of a particular user device for a given client requesting content from edge computing system 131.

System 131 may decrypt and decode content 210 and watermark at least a portion of the content with a digital watermark. Alternatively, server 110 may encode a first set of frames of content 210, and may not encode a second set of frames of content 210. Sever 110 may encrypt content 210 and transmit content 210 to edge computing system 131. Edge computing system 131 may decrypt content 210 and watermark the second set of frames of content 210. In another embodiment, server 110 may encode content 210 and encrypt a third set of frames of content 210 and may not encrypt a fourth set of frames of content 210. Server 110 may transmit content 210 to edge computing system 131. Edge computing system 131 may decode the fourth set of frames and digitally watermark these frames. In various embodiments, edge computing system 131 is configured to transmit content 210 containing digital watermarks to user device 151. The transmission between system 131 and user device 151 may be secure. For example, system 131 may encrypt content 210 and transmit encrypted content 210 to user device 151. In various embodiments, system 131 may also encode at least some portions of content 210 prior to encrypting content 210. For example, system 131 may encode the second set of frames of content 210.

In an example embodiment, edge computing system 131 may determine a load associated with a process of digitally watermarking content for various user devices 150. Depending on the load, system 131 may determine a number of frames of content 210 that may be watermarked. For example, when system 131 is experiencing a high load (e.g., when multiple user devices are requesting content) system 131 may be configured to watermark every $20^{th}$ frame, and when system 131 is experiencing a low load (e.g., when only a few user devices are requesting content) system 131 may be configured to watermark every $2^{nd}$ frame. It should be noted that the above example is only illustrative, and any other suitable determination of parameters affecting the process of digitally watermarking content subject to the computational load of system 131 may be used. For example, system 131 may select a type of the watermarking process to use depending on the load or modify parameters of the watermarking process that affect the computational cost of the watermarking process.

In various embodiments, there are numerous advantages for implementing watermarking at edge computing systems 132 instead of at the server 110. For example, edge computing systems 132 may have significantly more critical resources, such as memory (e.g., random access memory (RAM)), and processing power. An edge computing system (e.g., system 131, as shown in FIG. 15) may have limited scalability because it needs to support only devices that request content from that system. Further, system 131 may be configured to support any device, and system 131 may be secure as it may prevent any individual or software accessing its operational system, applications running on system 131, and any content of system 131. In various embodiments, a watermark insertion may be stateless, (i.e., designed not to remember preceding events or user interactions), and thus, it can be done at any edge computing system independently, without a need for shared memory or for database synchronization. Hence, a mobile device (e.g., device 152, as shown in FIG. 1) that changes the connection from one edge computing system to another may get content that contains a digital watermark based on device 152 identifiable information (e.g., device MAC address).

In some embodiments, edge computing system 131 may support post-encoding watermark insertion, meaning the content from a cloud server (e.g., server 110, as shown in FIG. 15) may be already encoded and encrypted. In such cases, server 110 may: (i) encrypt all frames of the content, but not instantaneous decoder refresh (IDR) or I frames, and edge computing system 131 may implement a digital watermark within the I frames; (ii) encrypt all the frames of the content, and system 131 may decrypt the content and insert the digital watermark into I or IDR frames and not re-encrypt I frames; (iii) encrypt all the frames of the content, and system 131 may decrypt all of the frames of the content and insert the digital watermark into I or IDR frames and re-encrypt I frames using the same group key (e.g., key 1512, as shown in FIG. 15); (iv) encrypt all the frames of the content, and system 131 may decrypt the content, decode the content and insert the digital watermark into the decoded content, and then re-encode and re-package and re-encrypt the content using just in time packaging and encryption.

Figure 16A:
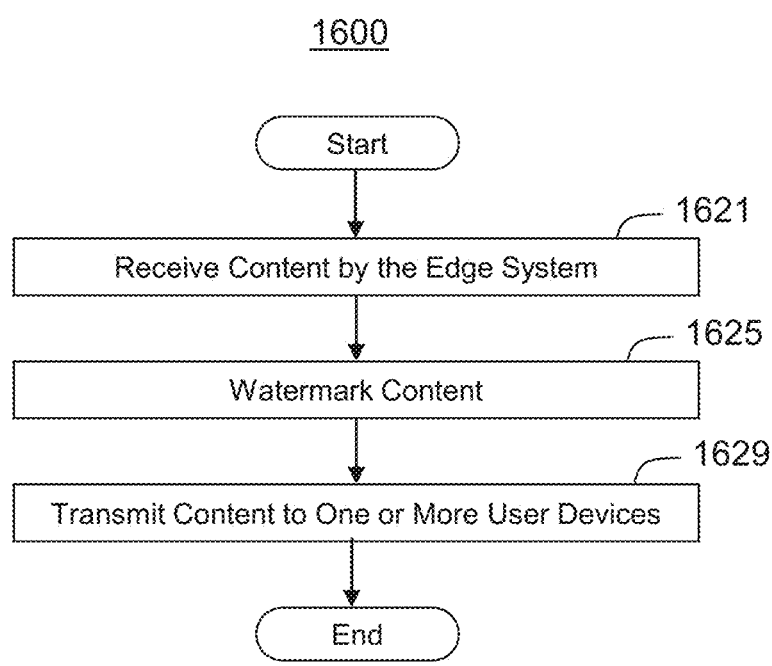
FIGS. 16A and 16B are illustrative flowcharts of a process of watermarking content consistent with disclosed embodiments.

FIG. 16A is an example flowchart of a process 1600 for watermarking and transmitting content to a user device. For example, process 1600 may describe watermarking a video signal corresponding to a broadcasting program. At step 1621, edge computing systems (e.g., system 131 and system 133, as shown in FIG. 1) may receive the content. For example, as previously described, systems 131 and 133 may be communicatively connected to a cloud computing system, a server and the like, and the content may be transmitted to systems 131 and 133 from the server (e.g., server 110, as shown in FIG. 1 or FIG. 15). Upon receiving the content, at step 1625, an edge computing system (e.g., system 133) may watermark the content. For example, at step 1625, system 133 may watermark the content with a digital watermark, reflecting an identification associated with a particular one of the user devices (e.g., device 153, as shown in FIG. 1) for which the content is transmitted, using a machine-learning approach (e.g., an approach based on a neural network, such as InfoGaN, as described above). In various embodiments, the digital watermark is not visually observable during playback of the content and may enable tracking of transmission of the content. For example, the digital watermark may help to determine which device receives the content, and in some cases, the digital watermark may determine various computing systems and connections involved in the transmission of the content to device 153. At step 1629, edge computing system 133 may transmit the watermarked content to user device 153. In various embodiments, the same content may be delivered to several devices (e.g., device 152 and device 153) via multicasting process, with each copy of the content watermarked with a particular digital watermark that is unique for the device to which the content is being transmitted.

Figure 16B:
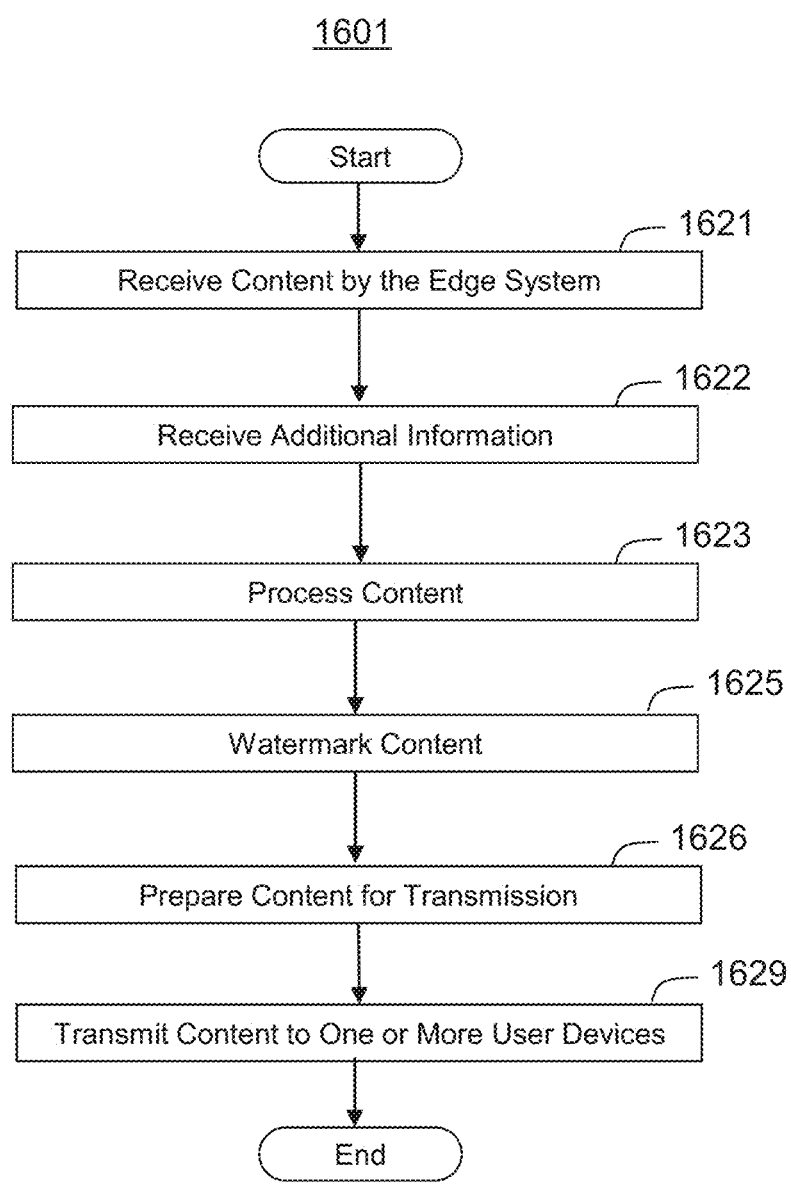

FIG. 16B shows a process 1601 that is similar to process 1600. For example, steps 1621, 1625, and 1629 of process 1601 are the same as the same numbered steps of process 1600. Additionally, at step 1622, an edge computing system (e.g., system 133) may receive additional instructions from a cloud computing system, a server, and the like. Additional instructions may include information about one or more devices to which the content is being transmitted (e.g., identification numbers for one or more devices), as well as instructions on how to watermark the content. For example, if the content is a video signal containing frames, the instructions may include information on which frames need to be watermarked, decoded, decrypted, and the like as described above. At step 1623, edge computing system 133 may perform content processing steps according to the received instructions prior to watermarking content at step 1625. The processing steps may include decrypting at least some of the frames of the video signal, decoding some of the frames of the video signal, and the like. Step 1623 may be followed by step 1625, and then followed by step 1626 of preparing content for transmission to one or more user devices (e.g., device 153). Step 1626 may include encoding at least some of the frames of the video signal (e.g., the frames of the video signal containing a digital watermark) and encrypting at least some of the frames of the video signal (e.g., the frames of the video signal containing a digital watermark). In various embodiments, after completion of step 1626, the content may be transmitted to one or more user devices in step 1629.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A processing system having at least one processor executing instructions for performing operations comprising:
    obtaining an identification associated with a user device configured to receive content;
    using an InfoGAN machine-learning approach, generating a digital watermark reflecting the user device identification;
    providing watermarked content by embedding the digital watermark in the content, wherein the digital watermark is not visually observable during playback of the watermarked content, and enables tracking of transmission of the watermarked content; and
    transmitting the watermarked content to the user device for the playback.

2. The system of claim 1, further comprising a discriminator configured to detect if the content includes a modified data that is visually observable during the playback of the content.

3. The system of claim 2, wherein the watermarked content is not detectable by the discriminator.

4. The system of claim 1, wherein generating the digital watermark and the watermarked content is performed by a generator that takes as an input the user device identification and the content, wherein the generator comprises a convolutional neural network.

5. The system of claim 4, wherein the generator further takes as an input control data.

6. The system of claim 4, wherein the generator further includes a preprocessing computer-based model for preprocessing frames of the content prior to generating the watermarked content.

7. The system of claim 1, further performing operations comprising identifying the user device identification based on the watermarked content.

8. A system comprising:
    one or more edge computing systems communicatively coupled to one or more user devices, at least one of the edge computing systems performing operations comprising:
        receiving content;
        using a machine-learning approach, watermarking the content with a digital watermark reflecting an identification associated with a particular one of the user devices, wherein the digital watermark is not visually observable during playback of the content and enables tracking of transmission of the content, wherein the watermarking of the content is performed by a convolutional neural network that takes as an input the identification, the content, and control data configured to control the digital watermark; and
        transmitting the watermarked content to the particular one of the user devices for the playback;
    wherein the identification is generated based on the watermarked content and the control data.

9. The system of claim 8, further comprising:
    a cloud computing system communicatively coupled to the one or more edge computing systems via a plurality of first data connections, the first data connections being part of a content distribution network; and
    the one or more edge computing systems communicatively coupled to the one or more user devices via a plurality of second data connections, the second data connections being part of the content distribution network.

10. The system of claim 8, wherein the watermarked content includes a plurality of video frames, and wherein a video frame from the plurality of video frames contains a plurality of instances of the identification associated with the particular one of the user devices, the identification located in a plurality of spatially separated parts of the frame.

11. The system of claim 8, further comprising a discriminator configured to detect if the content includes a modified data that is visually observable during the playback of the content, wherein the discriminator comprises a neural network.

12. The system of claim 8, wherein the identifier is a computer-based model trained to generate the user device identification based on training inputs comprising:
    the content; and
    the watermarked content.

13. The system of claim 12, further comprising a video distorter configured to:
    receive the watermarked content; and
    generate a distorted watermarked content.

14. The system of claim 13, wherein the operations further comprise: generating the identification based on the distorted watermarked content.

15. An edge computing system communicatively coupled with a server via a first secure connection, and communicatively coupled with a user device via a second connection, the edge computing system performing operations comprising:
    receiving a request for content from the user device, the request including user device identification information and a content identification;
    transmitting the content identification to the server;
    receiving the content from the server;
    using an InfoGAN machine-learning approach, generating a digital watermark reflecting the user device identification information;
    providing watermarked content by embedding the digital watermark in the content, wherein the digital watermark is not visually observable during playback of the watermarked content, and enables tracking of transmission of the watermarked content; and
    transmitting the watermarked content to the user device for the playback.

16. The edge computing system of claim 15, wherein the content includes a plurality of frames, and wherein the system further performs operations comprising:
    decrypting the plurality of frames received from the server using a first secure key associated with the edge computing system and the server;
    watermarking the plurality of frames; and encrypting the watermarked frames using a second secure key associated with the user device.

17. The edge computing system of claim 15, wherein the content includes a plurality of frames, and wherein the system further performs operations comprising:
re-encoding the plurality of frames of the content prior to providing the watermarked content; and
re-encrypting the plurality of frames of the watermarked content.

18. The system of claim 8, wherein the content includes a plurality of frames, and wherein the system further performs operations comprising:
decrypting the plurality of frames received from the server using a first secure key associated with the edge computing system and the server;
watermarking the plurality of frames; and
encrypting the watermarked frames using a second secure key associated with the user device.

19. The system of claim 8, wherein the content includes a plurality of frames, and wherein the system further performs operations comprising:
re-encoding the plurality of frames;
watermarking the plurality of frames; and
re-encrypting the plurality of frames.

20. The system of claim 8, wherein watermarking the content further includes a preprocessing computer-based model for preprocessing frames of the content prior to generating the watermarked content.

* * * * *